US012367176B2

(12) United States Patent
Jernigan, IV et al.

(10) Patent No.: US 12,367,176 B2
(45) Date of Patent: Jul. 22, 2025

(54) NON-DISRUPTIVE FILE MOVEMENT WITHIN A DISTRIBUTED STORAGE SYSTEM

(71) Applicant: NetApp, Inc., San Jose, CA (US)

(72) Inventors: Richard Parvin Jernigan, IV, Sewickley, PA (US); Umeshkumar Vasantha Rajasekaran, Cranberry Township, PA (US); Ying-Hao Wang, Pittsburgh, PA (US); Yuyu Zhou, Pittsburgh, PA (US)

(73) Assignee: NetApp, Inc., San Jose, CA (US)

( * ) Notice: Subject to any disclaimer, the term of this patent is extended or adjusted under 35 U.S.C. 154(b) by 17 days.

(21) Appl. No.: 18/305,927

(22) Filed: Apr. 24, 2023

(65) Prior Publication Data

US 2024/0354281 A1 Oct. 24, 2024

(51) Int. Cl.
*G06F 16/11* (2019.01)
*G06F 16/16* (2019.01)
*G06F 16/182* (2019.01)
*G06F 16/188* (2019.01)

(52) U.S. Cl.
CPC .......... *G06F 16/119* (2019.01); *G06F 16/116* (2019.01); *G06F 16/162* (2019.01); *G06F 16/183* (2019.01); *G06F 16/188* (2019.01)

(58) Field of Classification Search
CPC .................................................. G06F 16/119
See application file for complete search history.

(56) References Cited

U.S. PATENT DOCUMENTS

| | | |
|---|---|---|
| 7,991,734 B2 | 8/2011 | Park et al. |
| 9,886,697 B1 | 2/2018 | Sivertsen |
| 2001/0018766 A1* | 8/2001 | Morita ............... H04N 21/4351 725/39 |
| 2003/0182330 A1* | 9/2003 | Manley .................. H04L 67/06 |
| 2003/0182428 A1 | 9/2003 | Li et al. |
| 2006/0114836 A1 | 6/2006 | Pollin et al. |
| 2006/0265467 A1 | 11/2006 | Jang |
| 2011/0060887 A1* | 3/2011 | Thatcher ................ G06F 3/064 711/E12.001 |
| 2012/0036161 A1 | 2/2012 | Lacapra et al. |
| 2015/0370825 A1 | 12/2015 | Outcalt et al. |
| 2019/0215358 A1 | 7/2019 | Kobayashi et al. |
| 2020/0301880 A1* | 9/2020 | George ............... G06F 11/1451 |
| 2021/0049044 A1 | 2/2021 | Wong et al. |

OTHER PUBLICATIONS

Non-Final Office Action mailed on Sep. 11, 2024 for U.S. Appl. No. 18/488,755, filed Oct. 17, 2023, 27 pages.
Non-Final Office Action mailed on Sep. 29, 2024 for U.S. Appl. No. 18/488,727, filed Oct. 17, 2023, 18 pages.

* cited by examiner

*Primary Examiner* — Van H Oberly
(74) *Attorney, Agent, or Firm* — Jaffery Watson Hamilton & DeSanctis LLP

(57) ABSTRACT

Approaches for providing a non-disruptive file move are disclosed. A request to move a target file from the first constituent to the second constituent is received. The file has an associated file handle. The target file in the first constituent is converted to a multipart file in the first constituent with a file location for the new file in the first constituent. A new file is created in the second constituent. Contents of the target file are moved to a new file on the second constituent while maintaining access via the associated file handle via access to the multipart file. The target file is deleted from the first constituent.

27 Claims, 16 Drawing Sheets

NON-DISRUPTIVE FILE MOVEMENT WITHIN A DISTRIBUTED STORAGE SYSTEM

BACKGROUND

A node, such as a server, a computing device, a virtual machine, etc., may host a storage operating system. The storage operating system may be configured to store data on behalf of client devices, such as within volumes, aggregates, storage devices, cloud storage, locally attached storage, etc. In this way, a client can issue a read operation or a write operation to the storage operating system of the node to read data from storage or write data to the storage. The storage operating system may implement a storage file system through which the data is organized and accessible to the client devices. The storage file system may be tailored for managing the storage and access of data within hard drives, solid state drives, cloud storage, and/or other storage that may be relatively slower than memory or other types of faster and lower latency storage.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
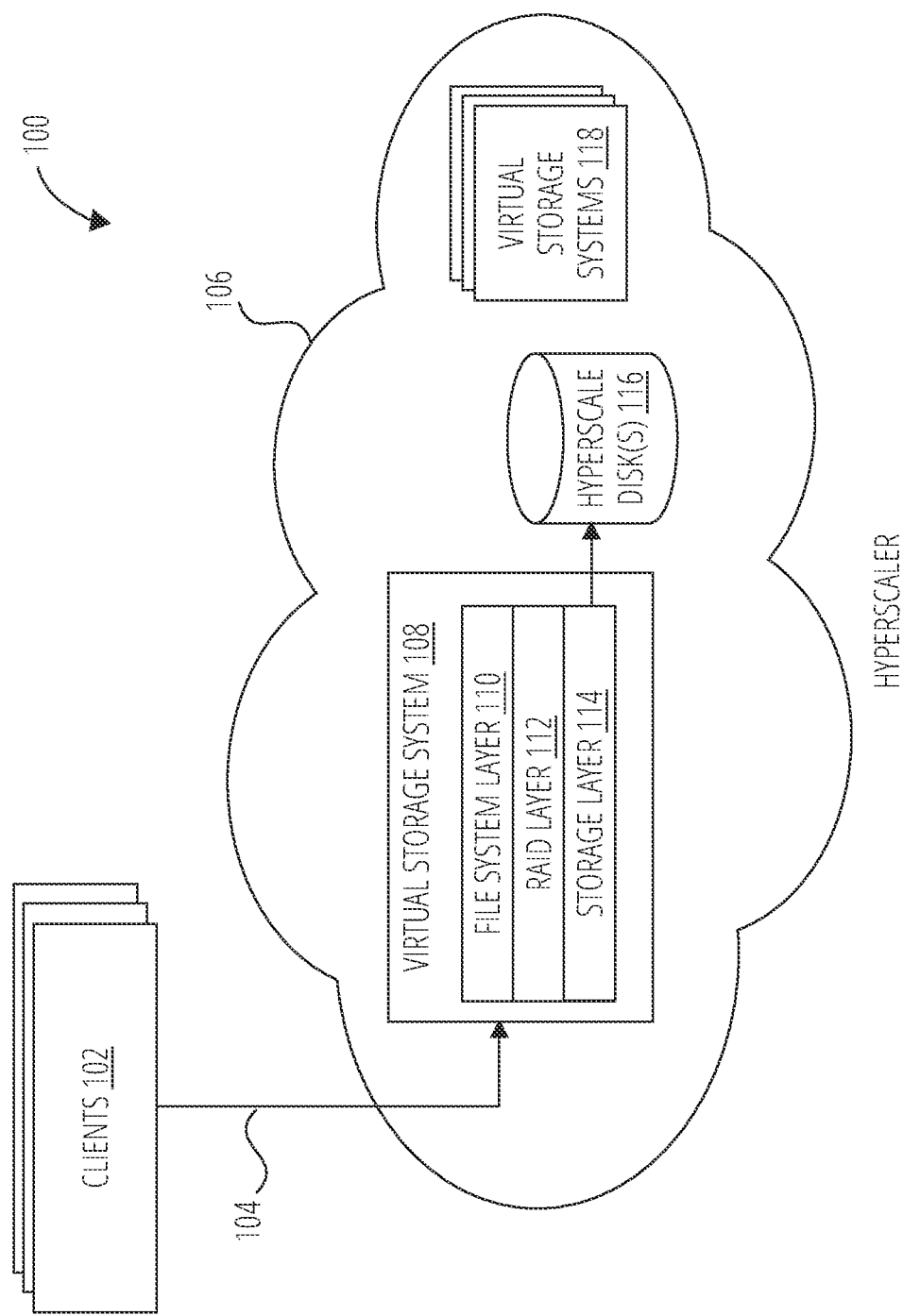
FIG. 1 is a block diagram illustrating an environment in which various embodiments may be implemented.

In the following description, for the purposes of explanation, numerous specific details are set forth to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

A distributed file system is a file system that is distributed on multiple file servers and can be distributed over multiple locations. This approach allows multiple users on multiple client devices to share files and storage resources. One example architecture described below (e.g., FIG. 1) is a cloud-based virtual storage architecture. Other architectures can also be utilized to provide a distributed file system.

In a distributed file system file placement is initially performed via implementation of one or more heuristics that provide an optimal placement of newly created files throughout the distributed system. For example, when a command is received to create a new data container (e.g., a subdirectory) in a distributed file system, a remote access module performs a first heuristic procedure to determine whether the new subdirectory should be created locally (e.g., on a flexible volume (or any other volume) associated with a physical node executing the command), or whether the subdirectory should be created remotely (e.g., on a flexible volume associated with a node not directly attached to the node receiving the command). If the subdirectory is to be created remotely, a second heuristic procedure may be performed to determine which remote flexible volume should hold the new subdirectory. The second heuristic procedure then selects the remote flexible volume. The subdirectory is then created on the identified remote flexible volume.

However, over time factors such as file size and file operations load may change to such a degree that the original placement may become sub-optimal. Thus, according to embodiments, mechanisms are provided to non-disruptively move files within the distributed file system to more accurately reflect an optimal distribution.

In some examples below, the distributed storage system can be managed via a storage operating system. Illustratively, the storage operating system can be the Data ONTAP® operating system available from NetApp™ Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this disclosure. Also, storage operating systems other than ONTAP® can be utilized including, for example, NetApp Cloud Volume Service available from NetApp™ Inc., AZURE® NetApp Files available from Microsoft Corporation, of Redmond, Washington, Amazon FSx® for NetApp ONTAP available from Amazon.com, Inc., of Bellevue, Washington, etc.

As one specific and non-limiting example, when utilizing the ONTAP® operating system, storage devices/volumes (e.g., aggregates) can be configured as a FlexGroup as supported by the ONTAP® operating system. However, it is expressly contemplated that any appropriate alternative storage operating system may be enhanced for use in accordance with the innovative principles described herein. Returning to the FlexGroup example, a constituent volume refers to the underlying flexible volume that provide the storage functionality of the FlexGroup. A FlexGroup is a single namespace/file system that can be made up of multiple constituent volumes ("constituents"). In an example, each FlexGroup contains an entity (e.g., "FlexGroup State") that has an object corresponding to each constituent of the FlexGroup and collects information for each constituent. The FlexGroup State can also exchange constituent information with other peer FlexGroups.

FlexGroup ingest heuristics attempt to keep their constituents balanced for capacity/performance. Occasionally, due to, for example, some unique workload in their environment, the FlexGroup constituents develop some imbalance. This can be caused by any number of factors in the workload, such as, for example, the number of files in a directory that are local to a constituent that starts growing as part of the application workflow or a set of large files in a particular constituent were deleted causing a constituent to be unbalanced compared to other constituents. This sort of imbalance can result in uneven utilization of constituents.

As new files and directories are created, ingest heuristics can steer a higher percentage of newly created content to under-filled constituents causing them to fill at a faster rate than peer constituents. Having a non-disruptive automated rebalancing mechanism that moves files between constituents will provide a way to rebalance constituents within a group. In an example, "non-disruptive" refers to both being non-disruptive to network attached storage (NAS) protocols and non-disruptive operations for the storage administrators.

As described in greater detail below, the non-disruptive move mechanisms can retroactively move a file to any volume/constituent of a group (of volumes/constituents). More specifically these mechanisms utilize an inode structure called a multipart inode that forms the building blocks to non-disruptively move a file. Various details regarding inode structures and non-disruptive file movement are described in greater detail below.

Continuing with the FlexGroup example from above, a file is stored in one of the constituents (C1) with an associated file handle (C-FH) within the constituent. These file handles (e.g., Network File System (NFS) file handles may be long lived) are used for subsequent file accesses. In some WAFL implementations, for example, file handles are constructed in a way that encodes where the file is stored. In these implementations movement of the file to a different volume would change the file handle and could disrupt file access. However, the techniques and mechanism described herein provide an improved, non-disruptive approach to managing the file handle and supporting file movement between volumes.

For non-disruptive file movement (e.g., rebalancing), the multipart inode can operate as a redirector file to enable a client device to have access to a valid file handle to ensure no disruptions. For example, a file (F1) that is being moved from a source constituent (C1) to a destination constituent (C2) has an associated file handle (C-FH). When the non-disruptive file movement occurs, a new file in the source constituent (C1) is created (FPart1_C1) as part of converting the original file (F1) to a multipart file.

In an example, the contents of the original file (F1) are moved to the file part (FPart1_C1) and the location of FPart1_C1 is written as an entry in the multipart catalog inode. The multipart catalog inode provides the internal mechanism to allow the client to access the file using the client file handle C-FH. Subsequently, FPart1_C1 can be accessed using a newly created internal file handle (e.g., source file handle, S-FH) via the multipart catalog inode. That is, when a client device uses the client file handle C-FH to access the file, the multipart catalog inode is used via which the location (i.e., where the data is hosted) of the part file FPart1_C1 is retrieved.

Because the part inode FPart1_C1 is on constituent C1, client traffic is routed to FPart1_C1 and data is returned to the client. After converting the original file to a multipart file, the file FPart1_C1 can be moved to the destination constituent C2. When the file is moved to C2 as FPart1_C2 the location of the part inode is changed atomically. Any subsequent client traffic on C-FH is routed to FPart1_C2 through the multipart file F1. Thus, there is no disruption to client access as the file handle stays intact throughout the file movement process.

FIG. 1 is a block diagram illustrating an environment in which various embodiments may be implemented. Specifically, FIG. 1 illustrates an example, cloud-based virtual storage architecture 100. In various examples described herein, virtual storage system 108, which may be considered exemplary of virtual storage systems of hyperscaler 106 (e.g., virtual storage system 108, virtual storage systems 118), may be run (e.g., on a VM or as a containerized instance, as the case may be) within a public cloud provided by a public cloud provider (e.g., hyperscaler 106). In the context of the example of FIG. 1, virtual storage system 108 makes use of storage (e.g., hyperscale disk(s) 116) provided by the hyperscaler, for example, in the form of solid-state drive (SSD) backed or hard-disk drive (HDD) backed disks. The cloud disks (which may also be referred to herein as cloud volumes, storage devices, or simply volumes or storage) may include persistent storage (e.g., disks) and/or ephemeral storage (e.g., disks).

Virtual storage system 108 may present storage over a network to clients 102 using various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 102 may request services of virtual storage system 108 by issuing input/output request(s) 104 (e.g., file system protocol messages (in the form of packets) over the network). A representative client of clients 102 may comprise an application, such as a database application, executing on a computer that "connects" to the virtual storage system 110 over a computer network, such as a point-to-point link, a shared local area network (LAN), a wide area network (WAN), or a virtual private network (VPN) implemented over a public network, such as the Internet.

In the context of the present example, virtual storage system 108 is shown including a number of layers, including file system layer 110 and one or more intermediate storage layers (e.g., RAID layer 112 and storage layer 114). These layers may represent components of data management software (not shown) of virtual storage system 108. File system layer 110 generally defines the basic interfaces and data structures in support of file system operations (e.g., initialization, mounting, unmounting, creating files, creating directories, opening files, writing to files, and reading from files). A non-limiting example of file system layer 110 is the Write Anywhere File Layout (WAFL) Copy-on-Write file system (which represents a component or layer of ONTAP software available from NetApp, Inc. of Sunnyvale, CA).

RAID layer 112 may be responsible for encapsulating data storage virtualization technology for combining multiple hyperscale disk(s) 116 into RAID groups, for example, for purposes of data redundancy, performance improvement, or both. Storage layer 114 may include storage drivers for interacting with the various types of hyperscale disk(s) 116 supported by hyperscaler 106. Depending upon the particular implementation file system layer 110 may persist data to hyperscale disk(s) 116 using one or both of RAID layer 112 and storage layer 114.

The various layers described herein, and the processing described below with reference to the flow diagram of FIG. 7 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms (e.g., servers, blades, network storage systems or appliances, and storage arrays, such as the computer system described with reference to FIG. 8 below.

Figure 2:
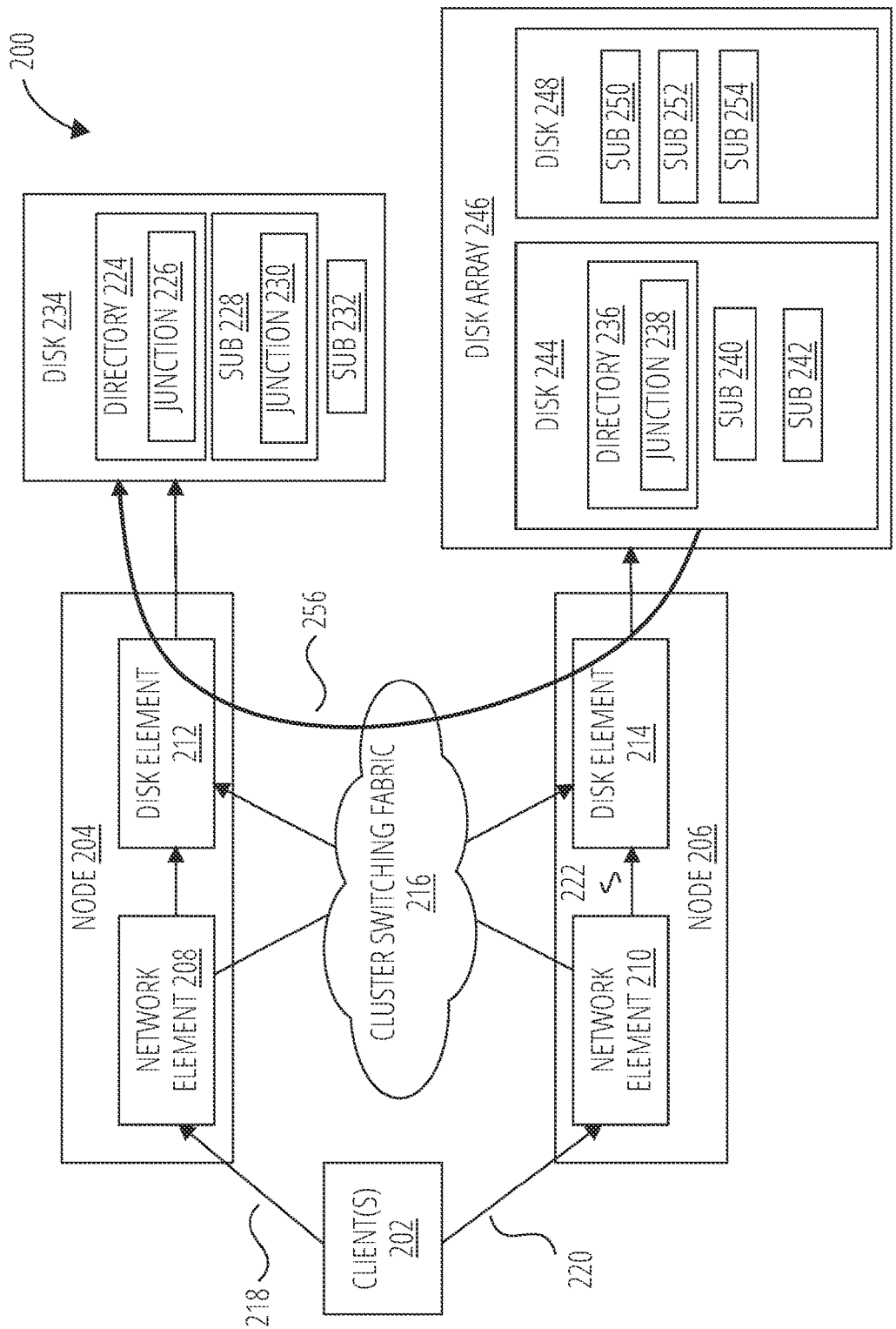
FIG. 2 illustrates one embodiment of a block diagram of a plurality of nodes interconnected as a cluster.

FIG. 2 illustrates one embodiment of a block diagram of a plurality of nodes interconnected as a cluster. The cluster of nodes illustrated in FIG. 2 can be configured to provide storage services relating to the organization of information on storage devices, for example, in cloud-based virtual storage architecture 100. Specifically, node 204 and node 206 can be part of virtual storage system 108 as illustrated in FIG. 1. Further, the cluster of nodes illustrated in FIG. 2 can be managed utilizing the non-disruptive move mechanisms described herein.

The nodes of FIG. 2 (e.g., node 204, node 206) include various functional components that cooperate to provide a distributed storage system architecture of cluster 200. To that end, each node is generally organized as a network element (e.g., network element 208 in node 204, network element 210 in node 206) and a storage element (also referred to as a disk element, for example, disk element 212 in node 204, disk element 214 in node 206). The network elements provide functionality that enables the nodes to connect to client(s) 202 over one or more network connections (e.g., 218, 220), while each disk element connects to one or more storage devices (e.g., disk 234, disk array 246).

In the example of FIG. 2, disk element 212 connects to disk 234 and disk element 214 connection to disk array 246 (which includes disk 244 and disk 248). Node 204 and node 206 are interconnected by cluster switching fabric 216 which, in an example, may be a Gigabit Ethernet switch or any other switch type. It should be noted that while there is shown an equal number of network and disk elements in cluster 200, there may be differing numbers of network and/or disk elements. For example, there may be a plurality of network elements and/or disk elements interconnected in a cluster configuration that does not reflect a one-to-one correspondence between the network and disk elements. As such, the description of a node comprising one network elements and one disk element should be taken as illustrative only.

Client(s) 202 may be general-purpose computers configured to interact with node 204 and node 206 in accordance with a client/server model of information delivery. That is, each client may request the services of a node, and the corresponding node may return the results of the services requested by the client by exchanging packets over one or more network connections (e.g., 218, 220).

Client(s) 202 may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Disk elements (e.g., disk element 212, disk element 214) are illustratively connected to disks that may be individual disks (e.g., disk 234) or organized into disk arrays (e.g., disk array 246). Alternatively, storage devices other than disks may be utilized, e.g., flash memory, optical storage, solid state devices, etc. As such, the description of disks should be taken as exemplary only. As described below, in reference to FIG. 4, a file system may implement a plurality of flexible volumes/constituents on the disks (e.g., disk 234, disk 244, disk 248). Example non-disruptive file move 256 between disk 244 and disk 234 can be accomplished utilizing the non-disruptive file movement approach described herein.

Flexible volumes/constituents may provide a plurality of directories (e.g., directory 224, directory 236) and a plurality of subdirectories (e.g., sub 228, sub 240, sub 250, sub 252, sub 254). Junctions (e.g., junction 226, junction 230, junction 238) may be located in directories and/or subdirectories. It should be noted that the distribution of directories, subdirectories and junctions shown in FIG. 2 is for illustrative purposes. As such, the description of the directory structure relating to subdirectories and/or junctions should be taken as exemplary only.

Figure 3:
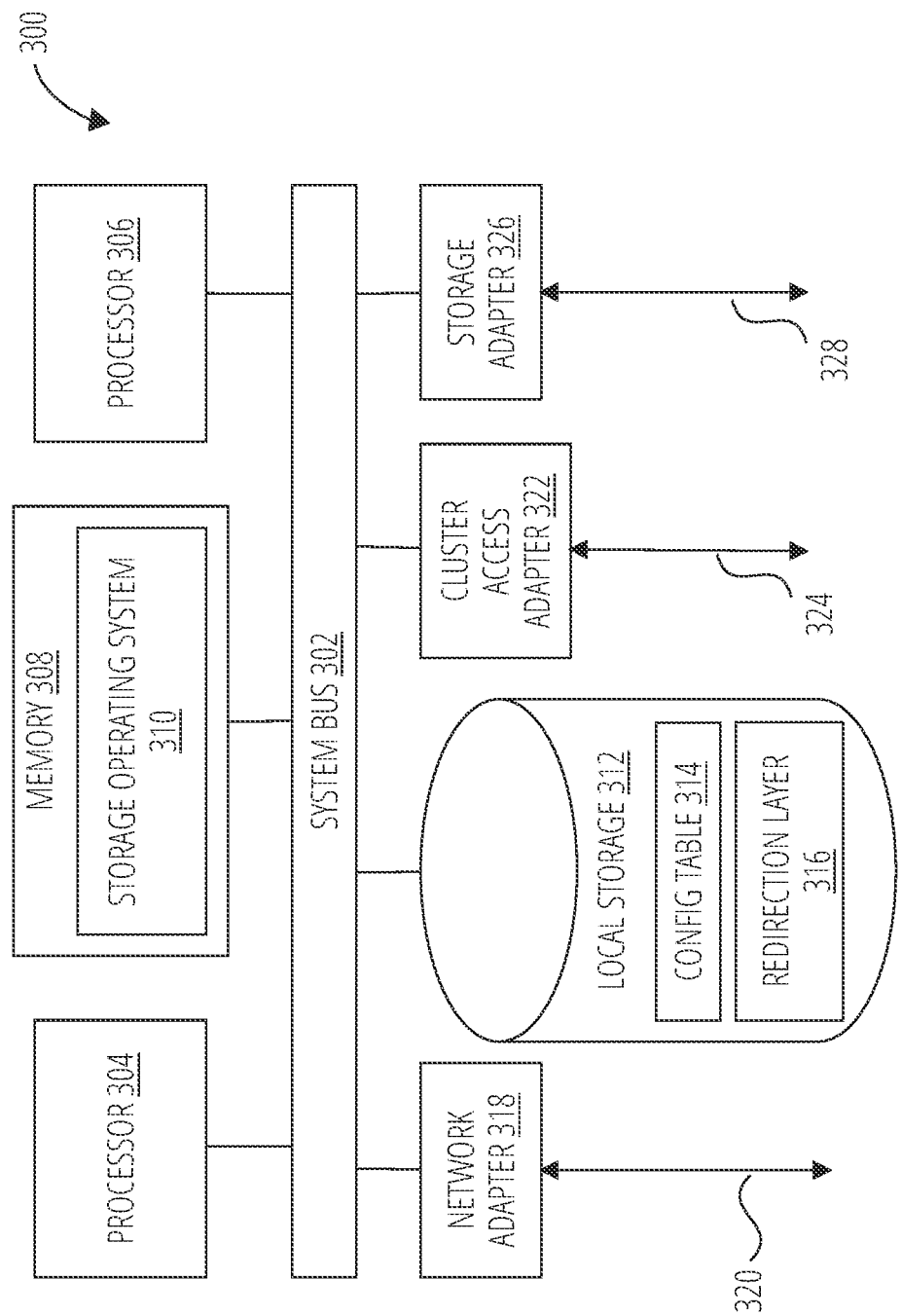
FIG. 3 illustrates one embodiment of a block diagram of a node.

FIG. 3 illustrates one embodiment of a block diagram of a node. Node 300 can be, for example, node 204 or node 206 as discussed in FIG. 2. The nodes illustrated in FIG. 3 can be managed utilizing the non-disruptive move mechanisms described herein.

In the example of FIG. 3, node 300 includes processor 304 and processor 306, memory 308, network adapter 318, cluster access adapter 322, storage adapter 326 and local storage 312 interconnected by 302. In an example, local storage 312 can be one or more storage devices, such as disks, utilized by the node to locally store configuration information (e.g., in config table 314) and/or multipart inode/redirection information (e.g., redirection layer 316). Local storage 312 can hold one or more volumes/constituents that can be involved in a non-disruptive file move using the approaches described herein.

Cluster access adapter 322 provides a plurality of ports adapted to couple node 300 to other nodes (not illustrated in FIG. 3) of a cluster. In an example, Ethernet is used as the clustering protocol and interconnect media, although it will be apparent to those skilled in the art that other types of protocols and interconnects may be utilized within the cluster architecture described herein. Alternatively, where the network elements and disk elements are implemented on separate storage systems or computers, cluster access adapter 322 is utilized by the network element (e.g., network element 208, network element 210) and disk element (e.g., disk element 212, disk element 214) for communicating with other network elements and disk elements in the cluster.

Figure 10:
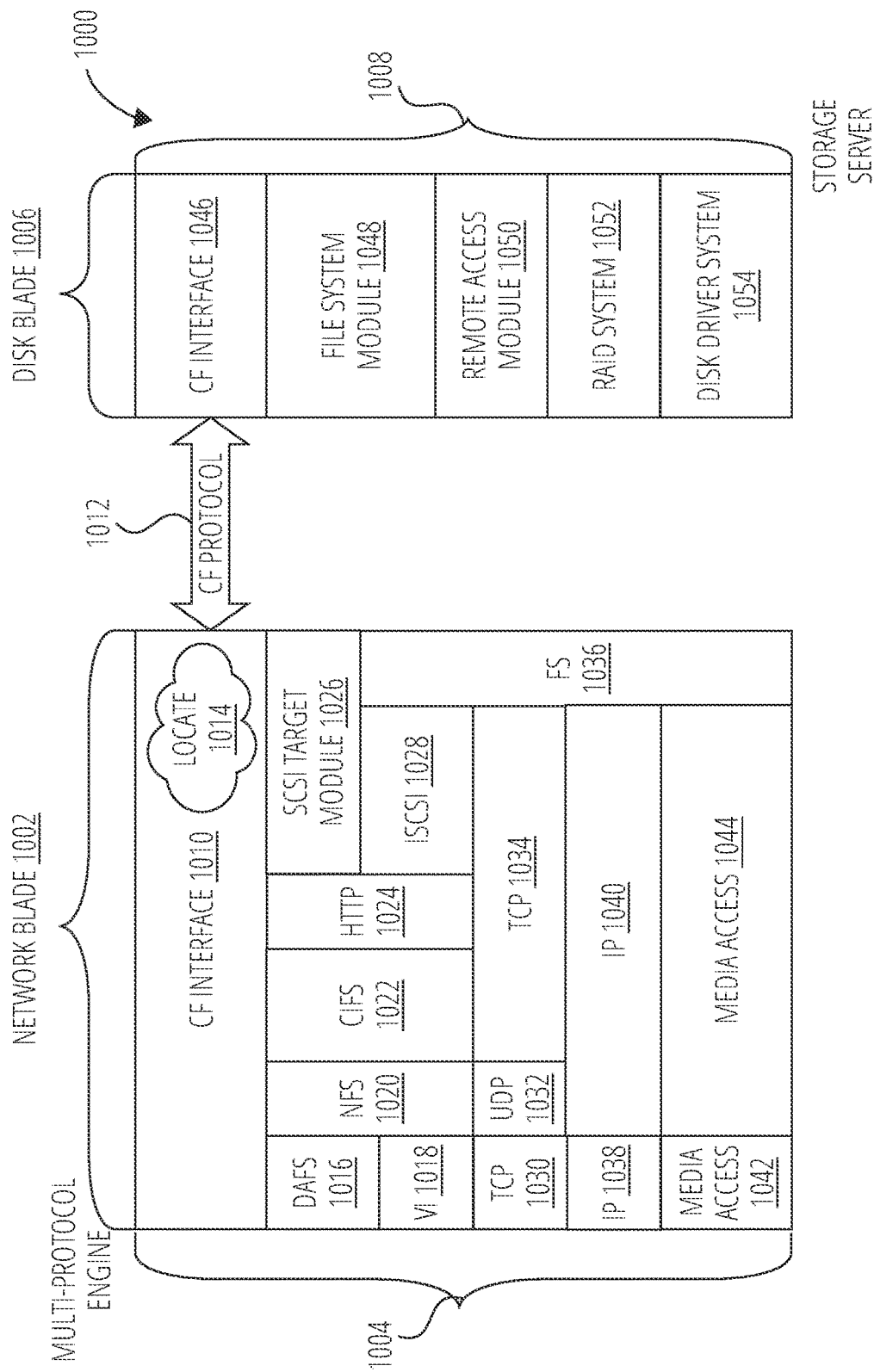
FIG. 10 is a schematic block diagram of a storage operating system that may be advantageously used with the subject matter.

In the example of FIG. 3, node 300 is illustratively embodied as a dual processor storage system executing storage operating system 310 that can implement a high-level module, such as a file system, to logically organize the information as a hierarchical structure of named directories, files and special types of files called virtual disks (hereinafter generally "blocks") on the disks. However, it will be apparent to those of ordinary skill in the art that node 300 may alternatively comprise a single or more than two processor system. In an example, processor 304 executes the functions of the network element on the node, while processor 306 executes the functions of the disk element. FIG. 10 provides further details with respect to an example schematic block diagram of a storage operating system.

In an example, memory 308 illustratively comprises storage locations that are addressable by the processors and adapters for storing software program code and data structures associated with the subject matter of the disclosure. The processor and adapters may, in turn, comprise processing elements and/or logic circuitry configured to execute the software code and manipulate the data structures. Storage operating system 310, portions of which is typically resident in memory and executed by the processing elements, functionally organizes node 300 by, inter alia, invoking storage operations in support of the storage service implemented by the node. It will be apparent to those skilled in the art that other processing and memory means, including various computer readable media, may be used for storing and executing program instructions pertaining to the disclosure described herein.

Illustratively, storage operating system 310 can be the ONTAP® operating system that implements a WAFL® file system. However, it is expressly contemplated that any appropriate storage operating system may be enhanced for use in accordance with the principles described herein. As such, where the term "WAFL" is employed, it should be taken broadly to refer to any storage operating system that is otherwise adaptable to the teachings of this disclosure.

In an example, to facilitate access to disks, storage operating system 310 implements a write-anywhere file system that cooperates with one or more virtualization modules to "virtualize" the storage space provided by the disks. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (LUNs).

In an example, storage of information on each array is implemented as one or more storage "volumes" that comprise a collection of physical storage disks cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

As used herein, the term "storage operating system" generally refers to the computer-executable code operable on a computer to perform a storage function that manages data access and may, in the case of a node, implement data access semantics of a general-purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that aspects of the disclosure described herein may apply to any type of special-purpose (e.g., file server, filer or storage serving appliance) or general-purpose computer, including a standalone computer or portion thereof, embodied as or including a storage system. Moreover, the teachings contained herein can be adapted to a variety of storage system architectures including, but not limited to, a network-attached storage environment, a storage area network and disk assembly directly attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the subject matter may be utilized with any suitable file system, including a write in place file system.

In an example, network adapter 318 provides a plurality of ports adapted to couple node 300 to one or more clients (e.g., client(s) 202) over one or more connections 320, which can be point-to-point links, wide area networks, virtual private networks implemented over a public network (Internet) or a shared local area network. Network adapter 318 thus may include the mechanical, electrical and signaling circuitry needed to connect the node to the network. Illustratively, the computer network may be embodied as an Ethernet network or a Fibre Channel (FC) network. Each client may communicate with the node over network connections by exchanging discrete frames or packets of data according to pre-defined protocols, such as TCP/IP.

Storage adapter 326 cooperates with storage operating system 310 to access information requested by the clients. The information may be stored on any type of attached array of writable storage device media such as video tape, optical, DVD, magnetic tape, bubble memory, electronic random-access memory, micro-electromechanical and any other similar media adapted to store information, including data and parity information. However, as illustratively described herein, the information is stored on disks or an array of disks utilizing one or more connections 324. Storage adapter 326 provides a plurality of ports having input/output (I/O) interface circuitry that couples to the disks over an I/O interconnect arrangement 328, such as a conventional high-performance, CF link topology.

In an example, a client file handle (C-FH) generally represents a file identity recorded in its parent directory corresponding to a file name. The C-FH includes a constituent identifier (ID), an inode number, and a generation. When the file identity changes the client (e.g., WINDOWS® client, NFS client) that is using the file can be impacted. Using the redirection approaches described herein the C-FH is a starting point for determining the location of user data block corresponding to a file. That is, the C-FH does not directly point to the user data blocks of the file, but points to an intermediate redirection layer that contains information regarding the location of the user data blocks of the file.

In an example, the non-disruptive file move operation builds on and is reliant on the multipart inode structure, which is described in greater detail below. The multipart inode structure can be considered a redirection layer (e.g., redirection layer 316) and alternative examples can utilize a database structure as the redirection layer. To preserve the C-FH during a file move, the multipart inode structure (or redirection layer structure) is logically interposed between the C-FH and an internal file handle that refers to (or points to) the user data blocks of a file. As a result, changing the underly internal file handles does not impact the C-FH, thereby allowing the C-FH to be used even after the file has been moved to another constituent.

In an example, the non-disruptive file move operation includes one or more of the following three phases: 1) decoupling C-FH from the user data; 2) movement of data within a defined window; and 3) a non-disruptive cutover to the new data location. In general, a cutover refers to the transition to the new data location being accessible to clients.

In an example, decoupling the C-FH from the user data occurs while setting up a new link (e.g., via the redirection layer or multipart inode structure) between the C-FH and the user data where the user data is referenced by a newly created internal file handle (e.g., source file handle, S-FH). After the decoupling the original C-FH refers to the internal database, which includes a record for the internal file handle S-FH, which refers to (points to) the user data blocks.

In an example, movement of data within a defined window utilizes a defined cutover time window to change the C-FH. When moving a file from a source constituent to a destination constituent, the source file handle S-FH is replaced with the destination file handle D-FH that points to the user data (located on the destination constituent). To avoid change to the C-FH during the cutover between the source constituent and the destination constituent, instead of replacing the C-FH, the operation replaces the record in the redirection layer 316 with the D-FH so that the C-FH remains intact in the directory entry.

In examples described in greater detail below, redirection layer 316 by implement/support use of a multipart inode structure in which the multipart inodes delegate ranges of a virtual file to part inodes that correspond to the specific ranges. When clients manipulate the multipart file, the clients use the client-visible file handle C-FH identifying the multipart (catalog) inode rather than the file handles identifying the part(s) in which the data is stored. The concept of a catalog inode is described in greater detail with respect to FIG. 5.

Input/output (I/O) operations observe that the provided file handle references a multipart inode and then use mapping information in the catalog to delegate I/O operations to the relevant part inodes. Thus, multipart inodes can be applied to allow data to be relocated to a different physical location without disrupting NFS clients. A first part can be relocated and, once relocation completes, the catalog can be updated to reference the relocated part. Clients continue to use the file handle for the multipart inode. However, future I/O requests will read the new file handle for the part from the catalog and can delegate I/O to the relocated part.

In some examples, an optimization can be applied to the approach described above. As discussed above, clients only perceive C-FH, and so normally only send requests to one location where the requests encounter the multipart catalog inode. However, If every request took this path only to be redirected to a different location, the latency could potentially increase significantly to unacceptable levels.

As an example optimization to avoid some of the potential latency increase, an in-memory cache of "routing information" can be inserted high into the protocol stack. In an ONTAP example, the cache is accessible in the N-blade, which is the component that receives inbound client traffic and decides which storage D-blade should serve that traffic. Other storage operating system configurations can utilize comparable structures.

When a request takes the "potentially slow path" where the request lands on the catalog inode for service, the catalog inode finds the database record corresponding to the appropriate child part inode, the data blocks are fetched from the new location where the data blocks reside and return that information back to the N-blade and then back to the client, but at the same time the routing information is returned to the N-blade to update the routing cache for the optimal routing for the next request.

Subsequent requests that try to access this region of the multipart file hit the routing information cache and can be routed directly to the child part inode for service without bouncing off the catalog inode first. If a request follows the routing information and encounters a stale inode, the request then bounces back and is routed to the catalog inode for service. This path would occur if the child part inode had been moved again, for example. The client that is waiting for a request to be serviced is unaware of these internal retries or routing caches, but the mechanism allows improvements in latency and throughput characteristics with multipart files that are essentially identical to regular files.

Figure 4:
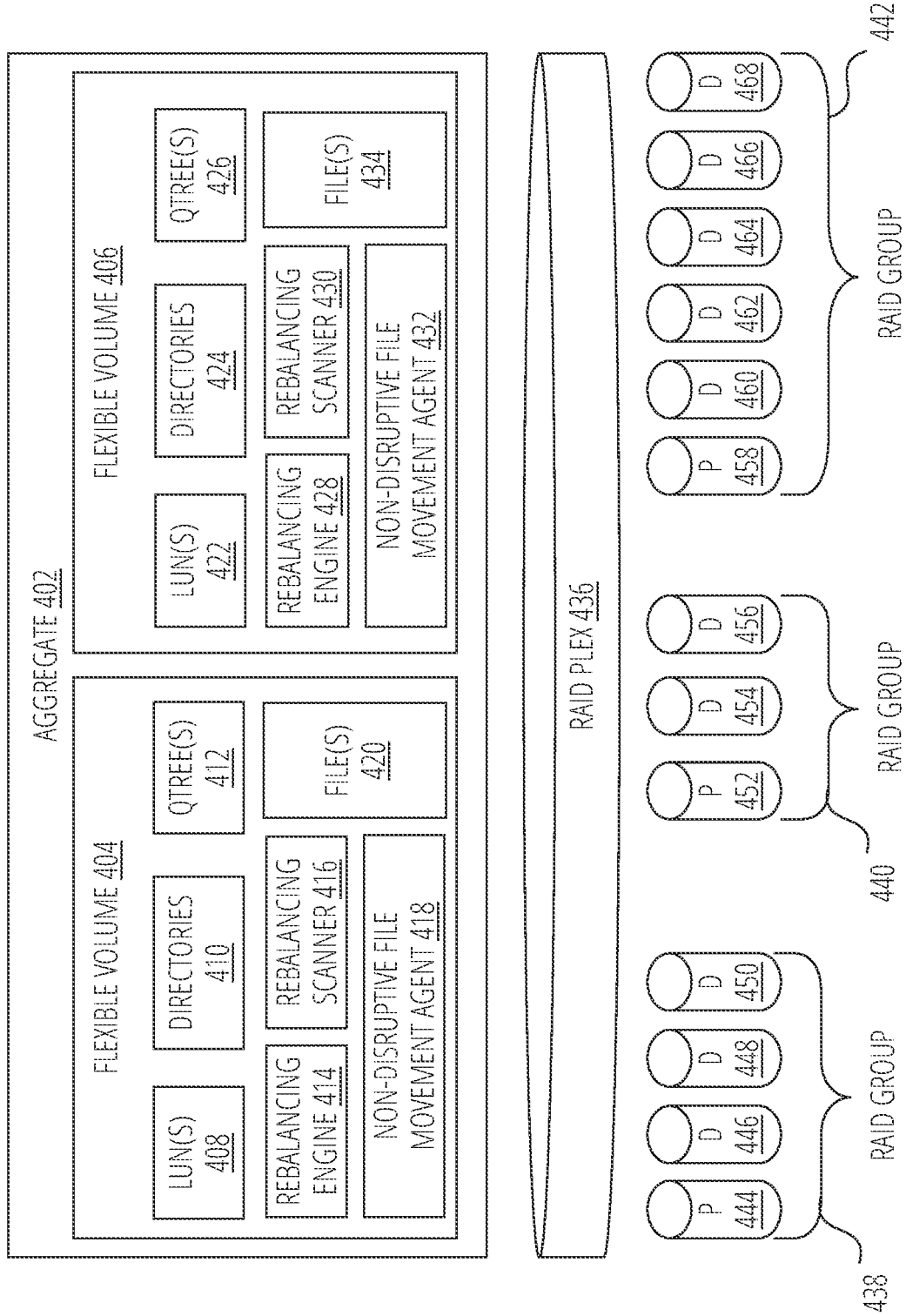
FIG. 4 illustrates one embodiment of a block diagram of an aggregate.
Figure 9:
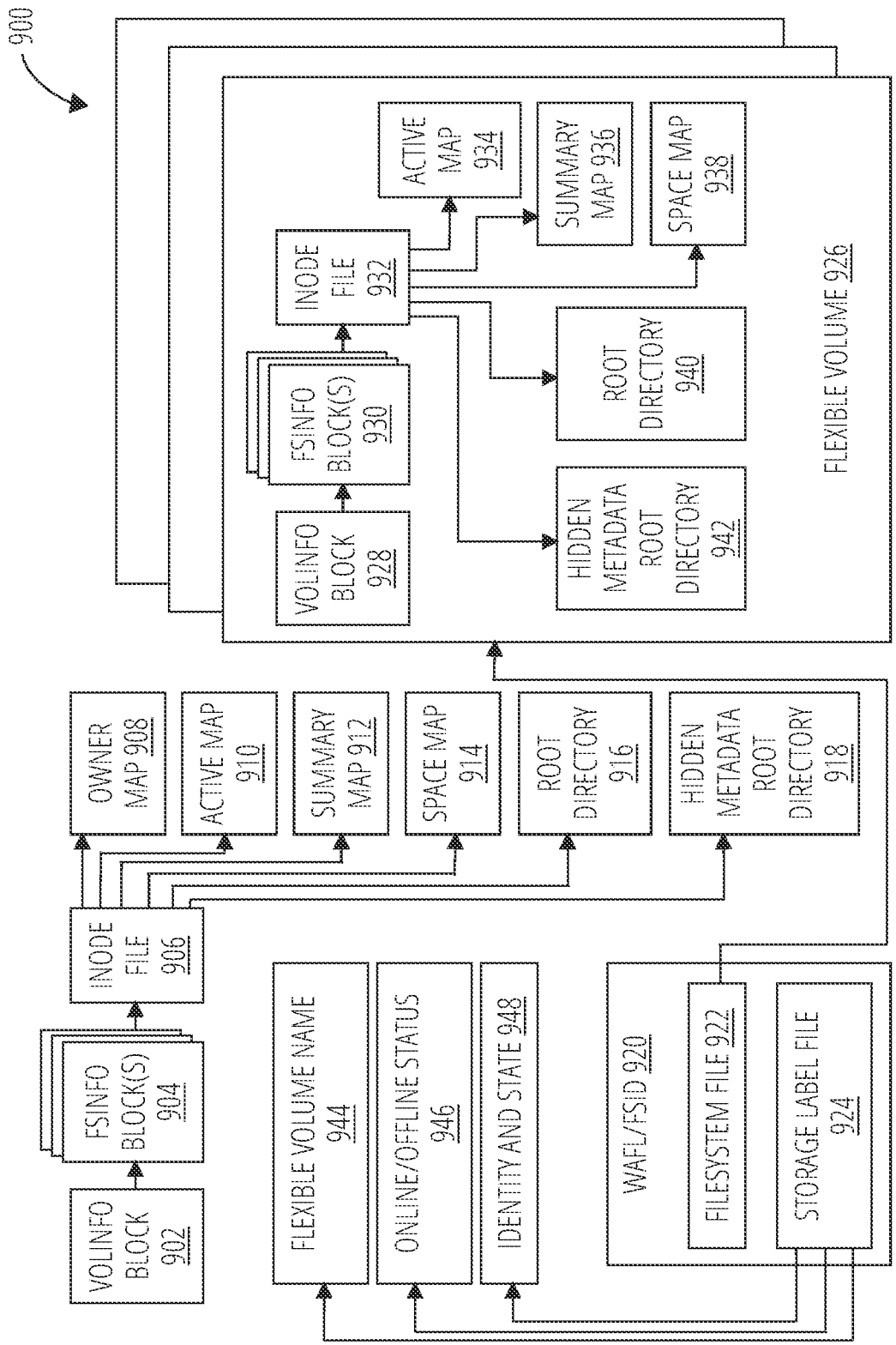
FIG. 9 illustrates one embodiment of a block diagram of an on-disk layout of an aggregate.

FIG. 4 illustrates one embodiment of a block diagram of an aggregate. FIG. 9 provides additional details with respect to example embodiments of an aggregate. In one embodiment, a file system layout is provided that apportions an underlying physical volume into one or more virtual volumes (or flexible volumes) of a storage system. In an example each flexible volume (e.g., flexible volume 404, flexible volume 406) can include a rebalancing engine (e.g., rebalancing engine 414, rebalancing engine 428), a rebalancing scanner (e.g., rebalancing scanner 416, rebalancing scanner 430), and a non-disruptive file movement agent (e.g., non-disruptive file movement agent 418, non-disruptive file movement agent 432) that operate to rebalance files.

In such an embodiment, the underlying physical volume is an aggregate comprising one or more groups of disks, such as RAID groups, of the node. In an example, aggregate 402 has its own physical volume block number (pvbn) space and maintains meta-data, such as block allocation structures, within that pvbn space. Each flexible volume (e.g., flexible volume 404, flexible volume 406) has its own virtual volume block number (vvbn) space and maintains meta-data, such as block allocation structures, within that vvbn space. Each flexible volume is a file system that is associated with a container file; the container file is a file in aggregate 402 that contains all blocks used by the flexible volume. Moreover, each flexible volume comprises data blocks and indirect blocks that contain block pointers that point at either other indirect blocks or data blocks.

LUN(s) 408, directories 410, Qtree(s) 412 and file(s) 420 are included within flexible volume 404 and, LUN(s) 422, directories 424, Qtree(s) 426 and file(s) 434 are included within flexible volume 406, such as dual vbn flexible volumes, that, in turn, are contained within aggregate 402. In one embodiment, flexible volume 404 and/or flexible volume 406 including elements within the flexible volumes may comprise junctions to provide redirection information to other flexible volumes, which may be contained within aggregate 402, may be stored in aggregate service by other key modules in the distributed file system. Assets, the description of elements being stored within a flexible volume should be taken as exemplary only. Aggregate 402 is illustratively layered on top of the RAID system, which is represented by at least one RAID plex 436 (depending upon whether the storage configuration is mirrored), wherein each RAID plex 436 includes at least one RAID group (e.g., RAID group 438, RAID group 440, RAID group 442). Each RAID group further comprises a plurality of disks, one or more data (D) disks (e.g., 446, 448, 450, 454, 456, 460, 462, 464, 466, 468) and at least one (P) parity disk (e.g., 444, 452, 458).

Whereas aggregate 402 is analogous to a physical volume of a conventional storage system, a flexible volume (e.g., flexible volume 404, flexible volume 406) is analogous to a file within that physical volume. That is, aggregate 402 may include one or more files, wherein each file contains a flexible volume and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume is also a logical volume, it has its own block allocation structures (e.g., active, space and summary maps) in its vvbn space.

In a further embodiment, pvbns are used as block pointers within buffer trees of files stored in a flexible volume. This "hybrid" flexible volume example involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system.

In a dual vbn hybrid flexible volume example, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks.

A root (top-level) inode, such as an embedded inode, references indirect (e.g., level 1) blocks. Note that there may be additional levels of indirect blocks (e.g., level 2, level 3) depending upon the size of the file. The indirect blocks (and inode) include pvbn/vvbn pointer pair structures that ultimately reference data blocks used to store the actual data of the file. The pvbns reference locations on disks of the aggregate, whereas the vvbns reference locations within files of the flexible volume. The use of pvbns as block pointers in the indirect blocks provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

A container file is a file in the aggregate that includes all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes.

Specifically, a physical file system directory includes a subdirectory for each flexible volume in the aggregate, with the name of subdirectory being a file system identifier (fsid) of the flexible volume. Each fsid subdirectory (flexible volume) contains at least two files, a file system file and a storage label file. The storage label file is illustratively a 4 kB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Aggregate 402 can be configured as a FlexGroup as supported by the ONTAP® operating system. However, it is expressly contemplated that any appropriate storage operating system may be enhanced for use in accordance with the inventive principles described herein. In the FlexGroup example, a constituent volume refers to the underlying flexible volume (e.g., flexible volume 404, flexible volume 406) that provide the storage functionality of the FlexGroup. A FlexGroup is a single namespace that can be made up of multiple constituent volumes ("constituents"). In an example, each FlexGroup contains an entity (e.g., "FlexGroup State") that has an object corresponding to each constituent of the FlexGroup and collects information for each constituent. The FlexGroup State can also exchange constituent information with other peer FlexGroups.

Figure 5:
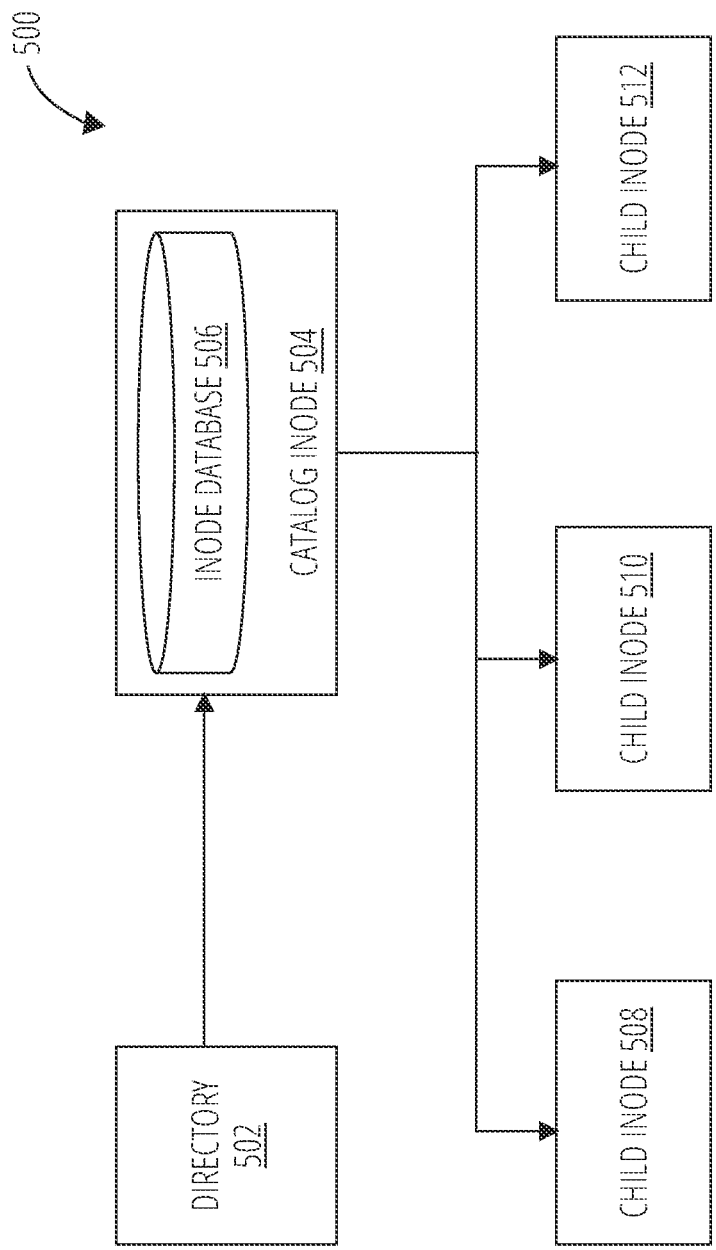
FIG. 5 illustrates one embodiment of a block diagram of a redirection layer.

FIG. 5 illustrates one embodiment of a block diagram of a redirection layer. In an example, redirection layer 500 includes directory 502 that points to catalog inode 504. In one embodiment, catalog inode 504 includes inode database 506 that operates as a multipart catalog that lists a plurality of child inodes (e.g., child inode 508, child inode 510, child inode 512). In such an embodiment, the child inodes each store components of file data such that a first component of data may be stored in child inode 508, a second component of data may be stored in child inode 510, a third component of data may be stored in child inode 512, etc. As a result, a conceptual location of a file may be disassociated with the actual location of the stored data. Example uses of the components illustrated in FIG. 5 are provided within the context of a non-disruptive file movement in the figures that follow.

Figure 6A:
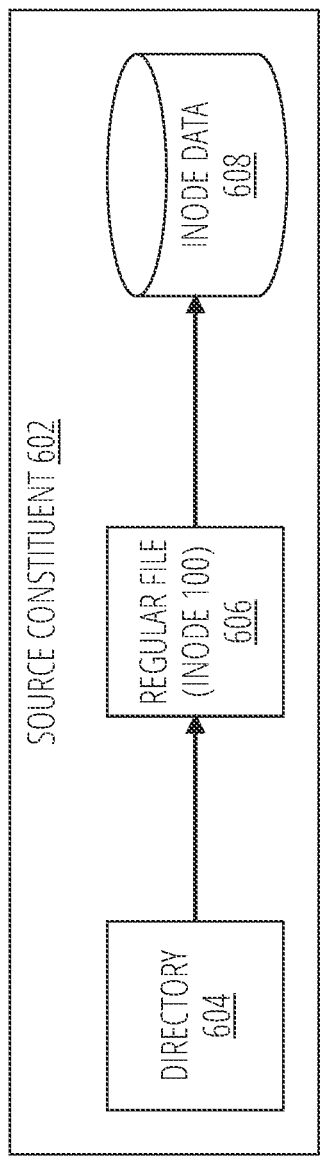
FIG. 6A illustrates a first stage of an example movement of a file from a first constituent to a second constituent using an example non-disruptive file move approach.

FIG. 6A illustrates a first stage of an example movement of a file from a first constituent to a second constituent using an example non-disruptive file move approach. As an example, all of the elements illustrated in FIG. 6A may reside in source constituent 602.

Initially, directory 604 can have a direct link pointing to regular file (inode 100) 606. In an example, this can be in a public inode space. In the example illustrated in FIG. 6A, regular file (inode 100) 606 is in the same constituent as directory 604. Alternatively, if regular file (inode 100) 606 and directory 604 are in different constituents, directory 604 would have a remote hard link to regular file (inode 100) 606. Inode data 608 stores the user data for regular file (inode 100) 606.

Figure 6B:
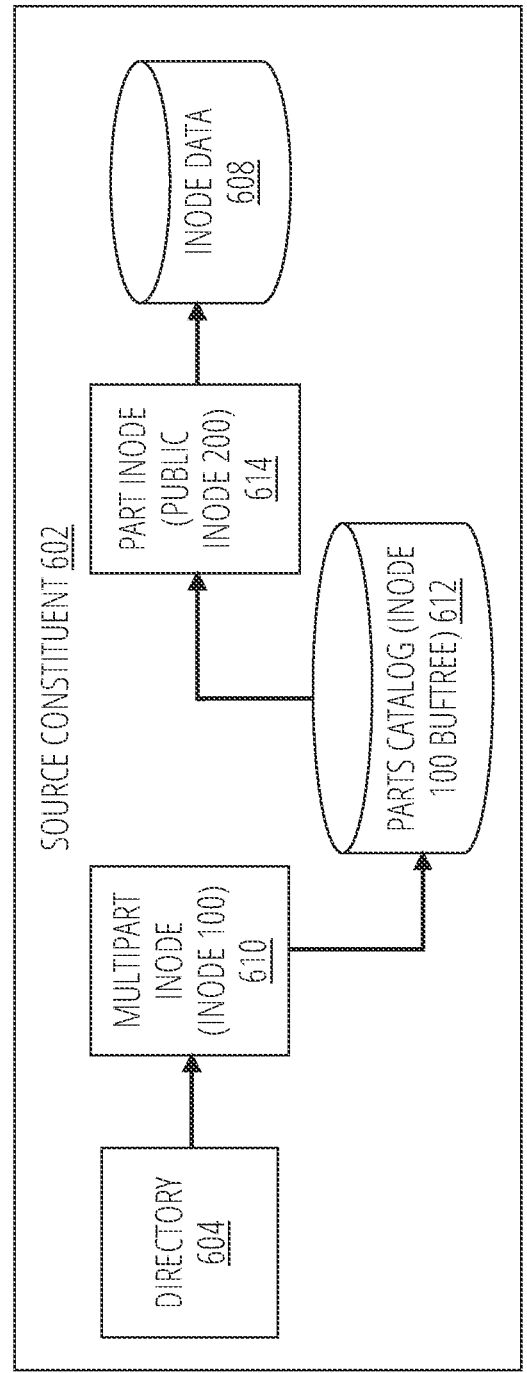
FIG. 6B illustrates a second stage of an example movement of a file from a first constituent to a second constituent using an example non-disruptive file move approach.

FIG. 6B illustrates a second stage of an example movement of a file from a first constituent to a second constituent using an example non-disruptive file move approach. As an example, all of the elements illustrated in FIG. 6B may reside in source constituent 602.

In the example of FIG. 6B, regular file (inode 100) 606 has been converted to multipart inode (inode 100) 610. That is regular file (inode 100) 606 has been converted to a regular file that uses multipart inodes as its on-disk representation.

In a WAFL example, a multipart inode subsystem can provide a WAFL message to perform the conversion from regular file (inode 100) 606 to multipart inode (inode 100) 610. The conversion process (whether WAFL or other) allocates a new inode (part inode (public inode 200) 614) in the same constituent as the original inode (multipart inode (inode 100) 610). Part inode (public inode 200) 614 is the part inode to which parts catalog (inode 100 buftree) 612 points. Parts catalog (inode 100 buftree) 612 can provide links to any number of part inodes in a similar manner. In an example, parts catalog (inode 100 buftree) 612 is a database that contains an entry that references part inode (public inode 200) 614. The original inode (regular file (inode 100) 606) identity information (e.g., inode number, generation number) does not change as part of the conversion to multipart inode (inode 100) 610.

Directory 604 that contains a link to regular file (inode 100) 606 still points to the same inode (now multipart inode (inode 100) 610) except that the inode acts as a multipart inode after the conversion and parts catalog (inode 100 buftree) 612 provides further indirection to point to part inode (public inode 200) 614 that contains the buftree for regular file (inode 100) 606. Once the original inode (regular file (inode 100) 606) is converted to a multipart inode (multipart inode (inode 100) 610) the corresponding part inode(s) (part inode (public inode 200) 614) can be moved from a first constituent to a second constituent without the knowledge of external NAS clients. In an example, the file movement is part of file rebalancing activities that are based on operations by a rebalancing engine and/or a rebalancing scanner.

In an example, the non-disruptive file movement agent (e.g., non-disruptive file movement agent 418) quiesces the inode to be moved (e.g., part inode (public inode 200) 614). In an example, the non-disruptive file movement agent can establish a write fence on the inode to be moved. In the example of FIG. 6B, multipart inode (inode 100) 610 is not quiesced because multipart inode (inode 100) 610 can still be accessed by a client. It is only part inode (public inode 200) 614 that cannot be accessed temporarily.

Figure 6C:
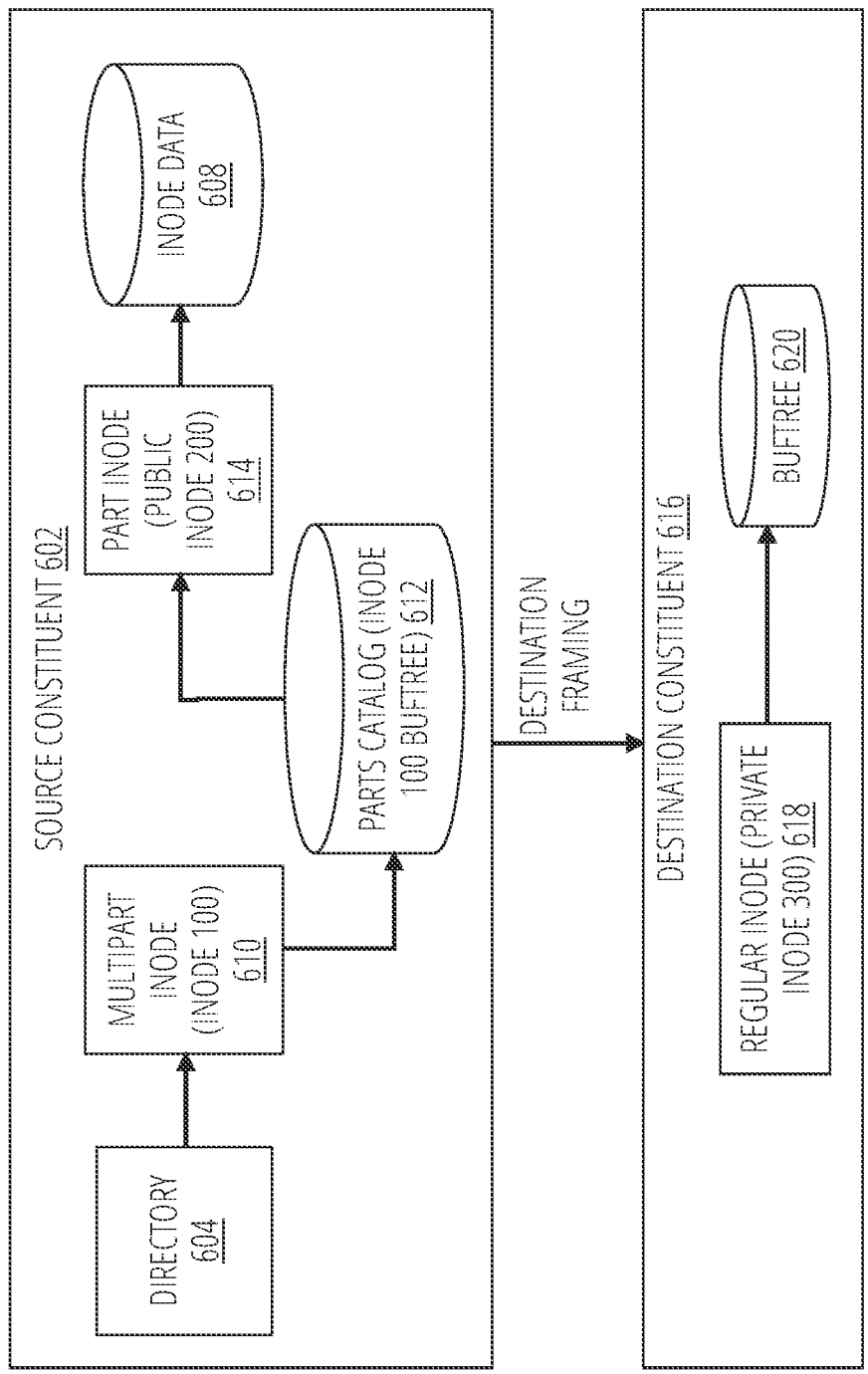
FIG. 6C illustrates a third stage of an example movement of a file from a first constituent to a second constituent using an example non-disruptive file move approach.

FIG. 6C illustrates a third stage of an example movement of a file from a first constituent to a second constituent using an example non-disruptive file move approach. Once the original inode is converted to a multipart inode (e.g., multipart inode (inode 100) 610), the part inode (e.g., part inode (public inode 200) 614) can be moved from source constituent 602 to destination constituent 616 without disruption to (or knowledge of) external NAS clients. In an example, a non-disruptive file movement agent (e.g., non-disruptive file movement agent 418) manages the movement of the part inode from source constituent 602 to destination constituent 616.

The created inode (e.g., regular inode (private inode 300) 618) is a private inode and buftree 620 is framed but not allocated. That is, the L0 blocks of 620 are not filled at this stage. Once buftree 620 has been framed, the cutover can be performed. In some cases, if the cutover time window is reached while the framing is still in progress the non-disruptive file movement agent can perform the cutover with the partially frames buftree and the framing can be finished after the cutover.

Figure 6D:
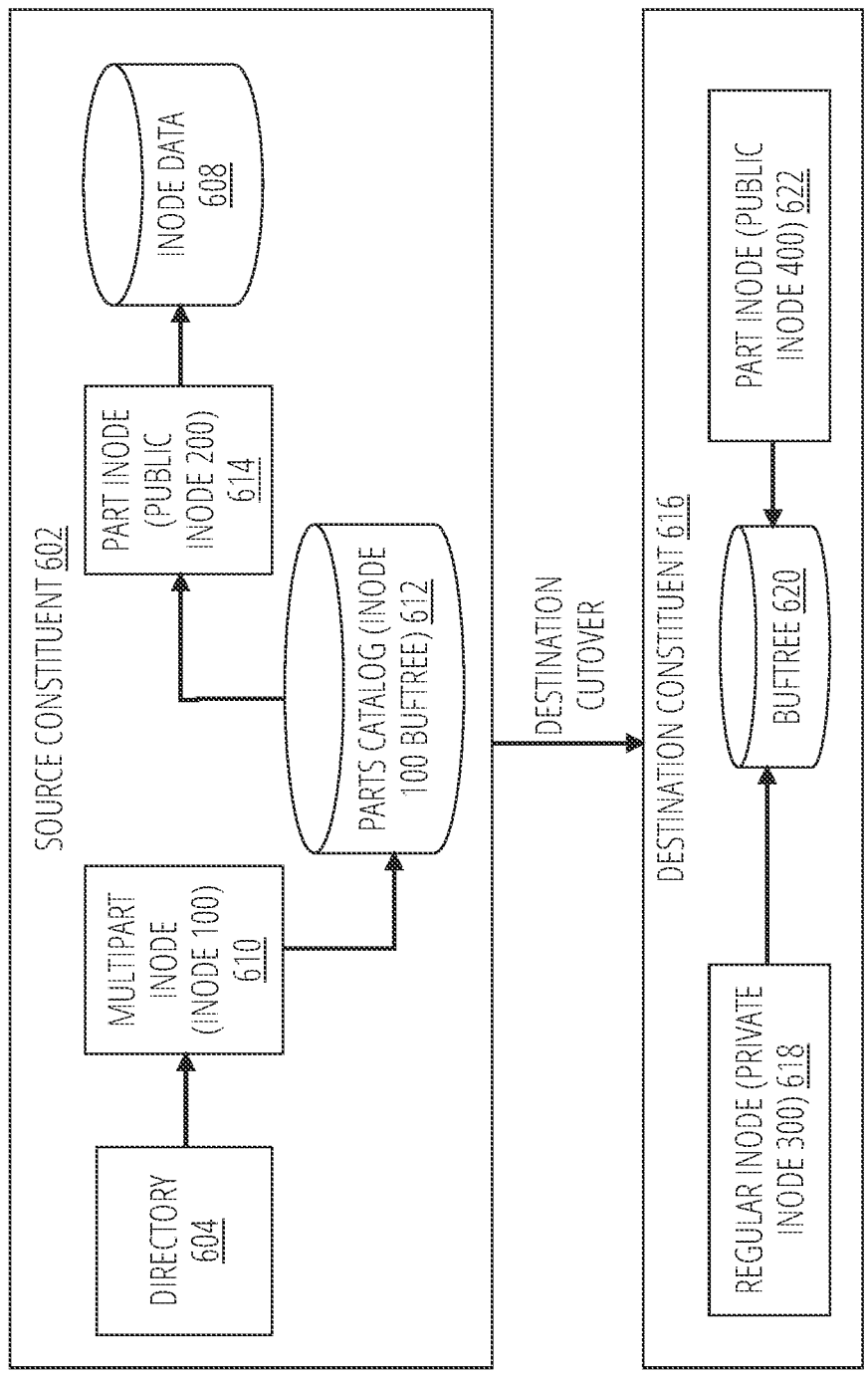
FIG. 6D illustrates a fourth stage of an example movement of a file from a first constituent to a second constituent using an example non-disruptive file move approach.

FIG. 6D illustrates a fourth stage of an example movement of a file from a first constituent to a second constituent using an example non-disruptive file move approach. As part of the cutover process, the non-disruptive file movement agent creates a new public inode (e.g., part inode (public inode 400) 622) on destination constituent 616. This new public inode (part inode (public inode 400) 622) will be the equivalent of the part inode (part inode (public inode 200) 614) on source constituent 602.

Figure 6E:
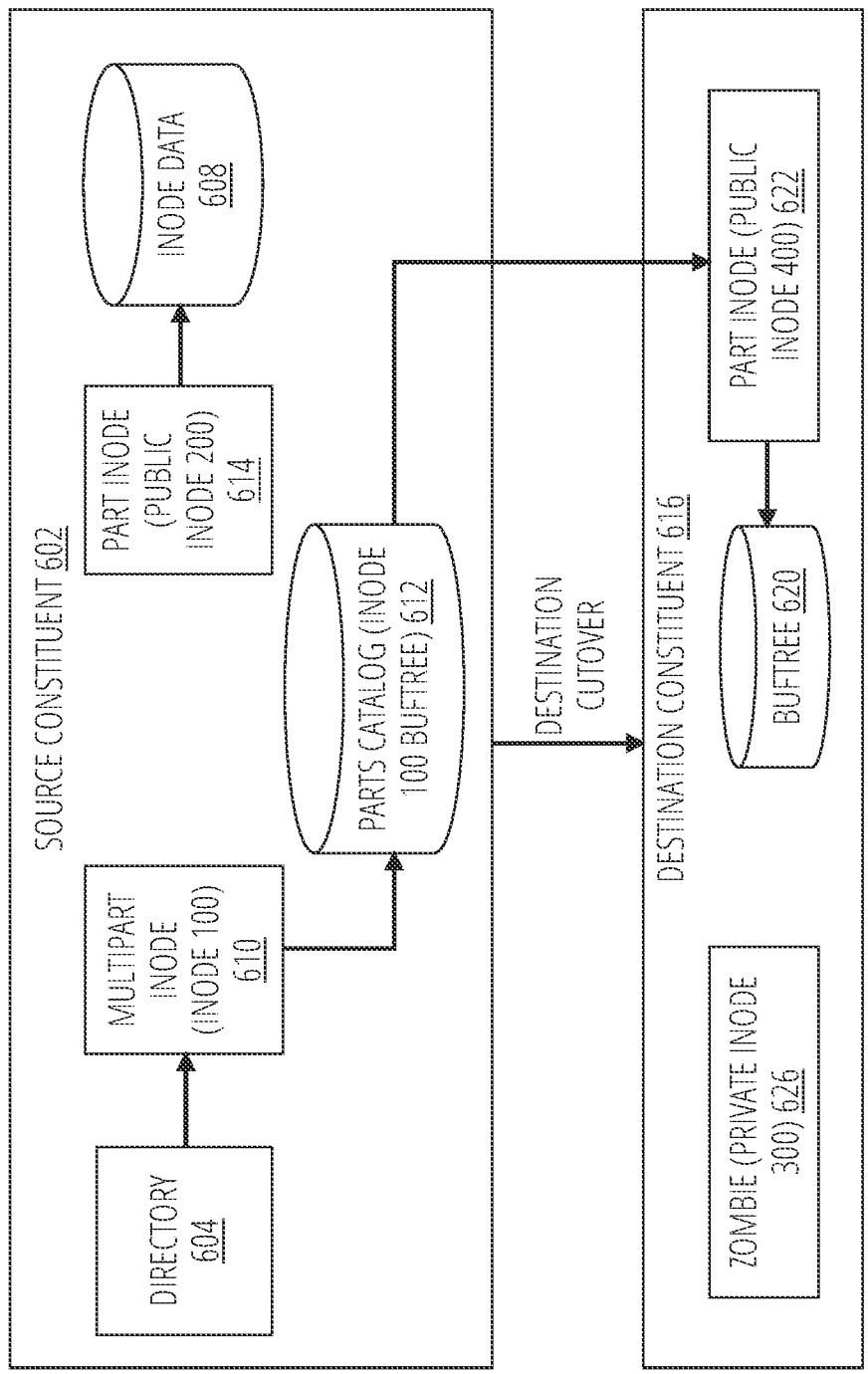
FIG. 6E illustrates a fifth stage of an example movement of a file from a first constituent to a second constituent using an example non-disruptive file move approach.

FIG. 6E illustrates a fifth stage of an example movement of a file from a first constituent to a second constituent using an example non-disruptive file move approach. As part of the cutover, parts catalog (inode 100 buftree) 612 of multipart inode (inode 100) 610 is changed to point to part inode (public inode 400) 622 on destination constituent 616. The new public inode (part inode (public inode 400) 622) will be equivalent to part inode (public inode 200) 614. The framed buftree (buftree 620) with the absent allocated blocks is attached to part inode (public inode 400) 622. The private inode (regular inode (private inode 300) 618) that was holding buftree 620 will undergo a process to free the private node (zombie (private inode 300) 626).

At this stage, the new public inode (part inode (public inode 400) 622) will assume the identity of the part inode (part inode (public inode 200) 614) with the parts catalog (parts catalog (inode 100 buftree) 612) of the multipart inode (multipart inode (inode 100) 610) that was referencing the old part inode (part inode (public inode 200) 614) is now pointing to the new part inode (part inode (public inode 400) 622) at destination constituent 616. Thus, in a WAFL environment, any WAFL message accessing multipart inode (inode 100) 610 will only see part inode (public inode 400) 622 at destination constituent 616. At this stage, part inode (public inode 200) 614 does not have a parts catalog entry pointing to it.

Figure 6F:
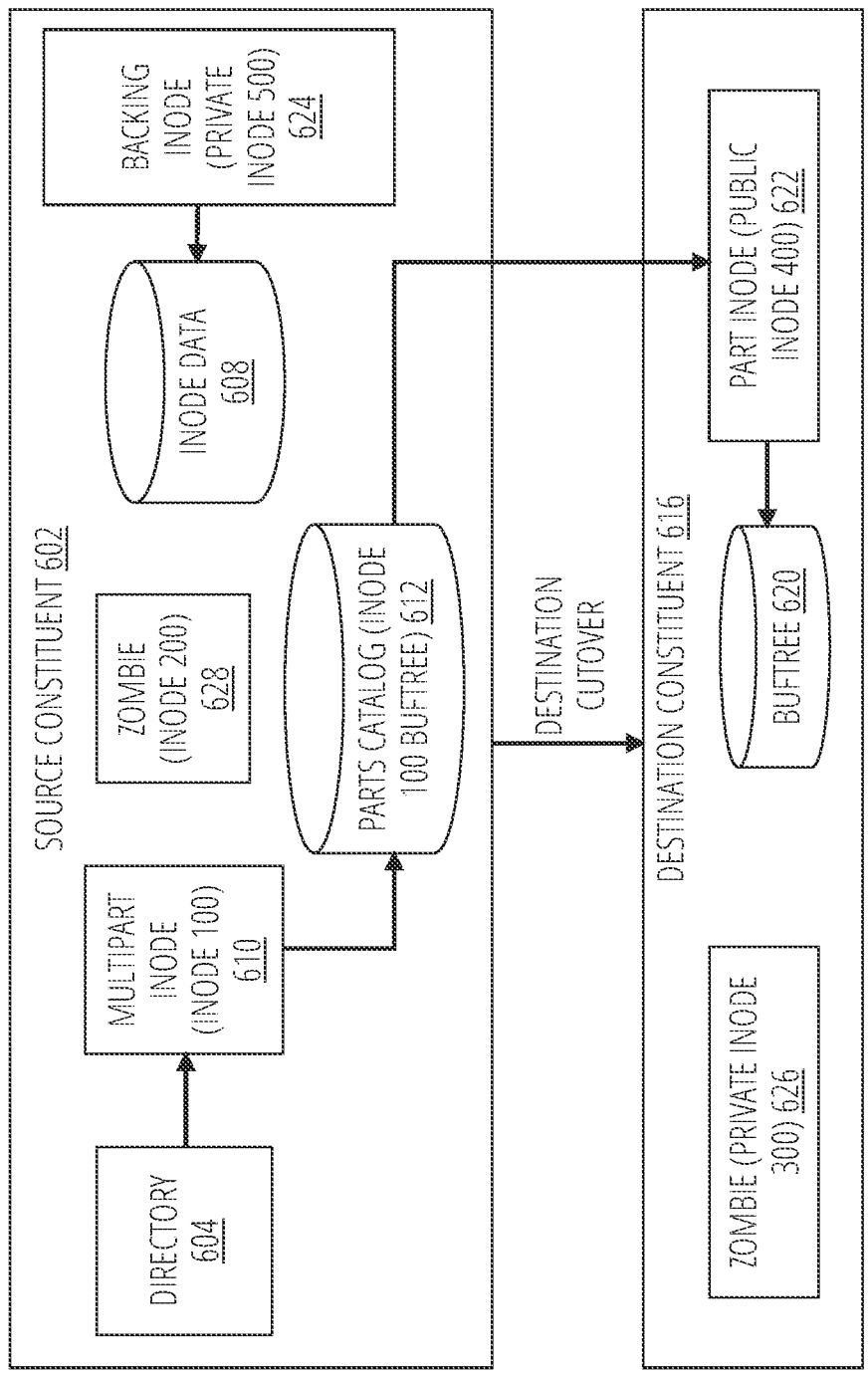
FIG. 6F illustrates a sixth stage of an example movement of a file from a first constituent to a second constituent using an example non-disruptive file move approach.

FIG. 6F illustrates a sixth stage of an example movement of a file from a first constituent to a second constituent using an example non-disruptive file move approach. After the cutover process is finished, the file is now available for both reads/writes to the file. Access will now flow to part inode (public inode 400) 622 residing in destination constituent 616. The old part inode (part inode (public inode 200) 614) is freed (now zombie (inode 200) 628), but inode data 608 is not attached to zombie (inode 200) 628.

However, inode data 608 is still needed to populate the L0 blocks of part inode (public inode 400) 622 at destination constituent 616. This is accomplished by transferring contents of inode data 608 to a private inode (backing inode (private inode 500) 624) that serves as a private backing metafile for inode data 608. Now, while the file is accessible by the NAS clients for reads/writes, the L0 blocks are transferred from backing inode (private inode 500) 624 in source constituent 602 to part inode (public inode 400) 622 in the public inode space.

Figure 6G:
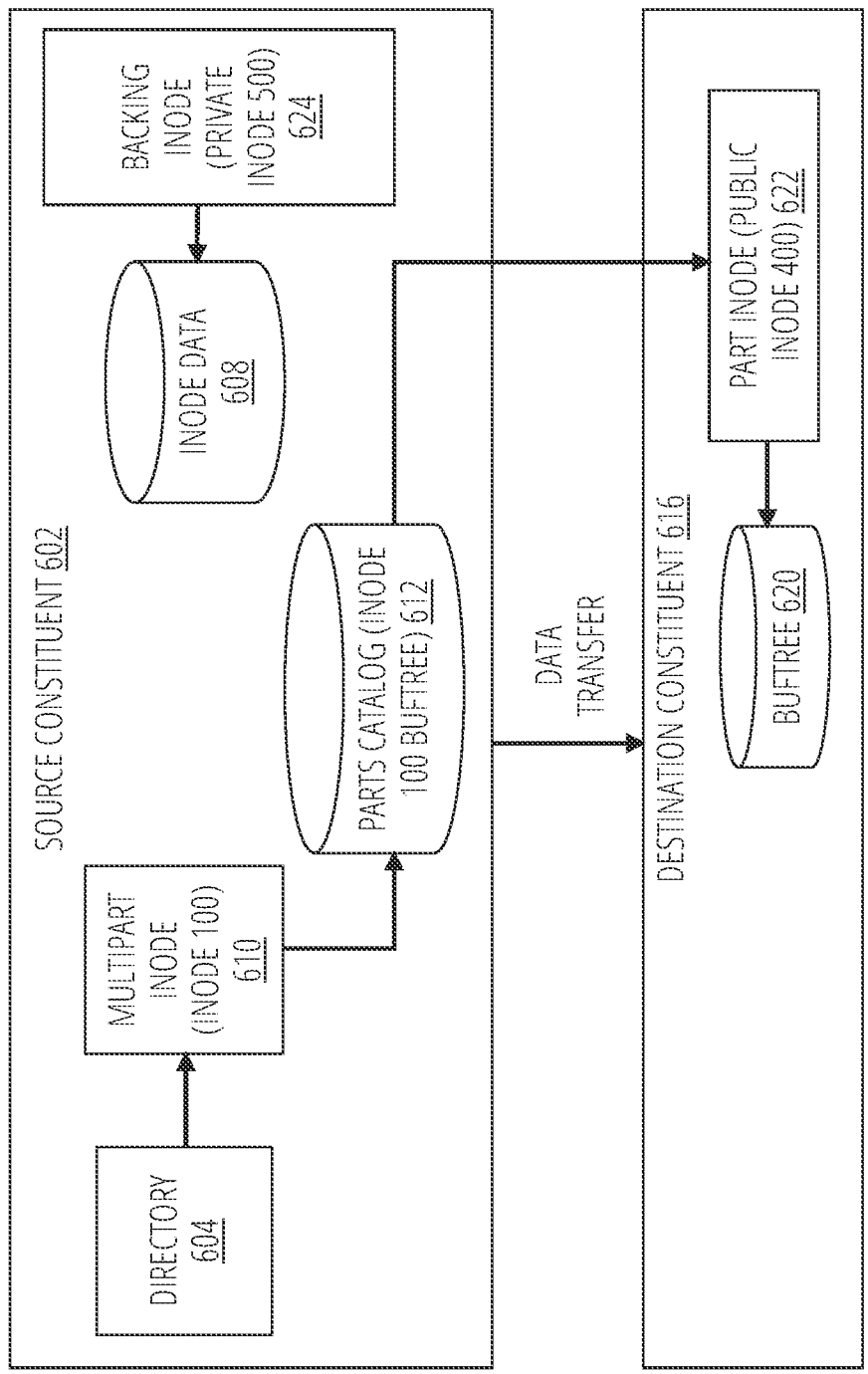
FIG. 6G illustrates a seventh stage of an example movement of a file from a first constituent to a second constituent using an example non-disruptive file move approach.

FIG. 6G illustrates a seventh stage of an example movement of a file from a first constituent to a second constituent using an example non-disruptive file move approach. In an example, after the entire data transfer is finished, the non-disruptive file movement agent releases the source inode (part inode (public inode 200) 614/zombie (inode 200) 628) by freeing all the blocks associated with that source inode. Similarly, the non-disruptive file movement agent also releases the private inode (regular inode (private inode 300) 618/zombie (private inode 300) 626) by freeing all of the blocks associated with the private inodes in destination constituent 616.

Figure 6H:
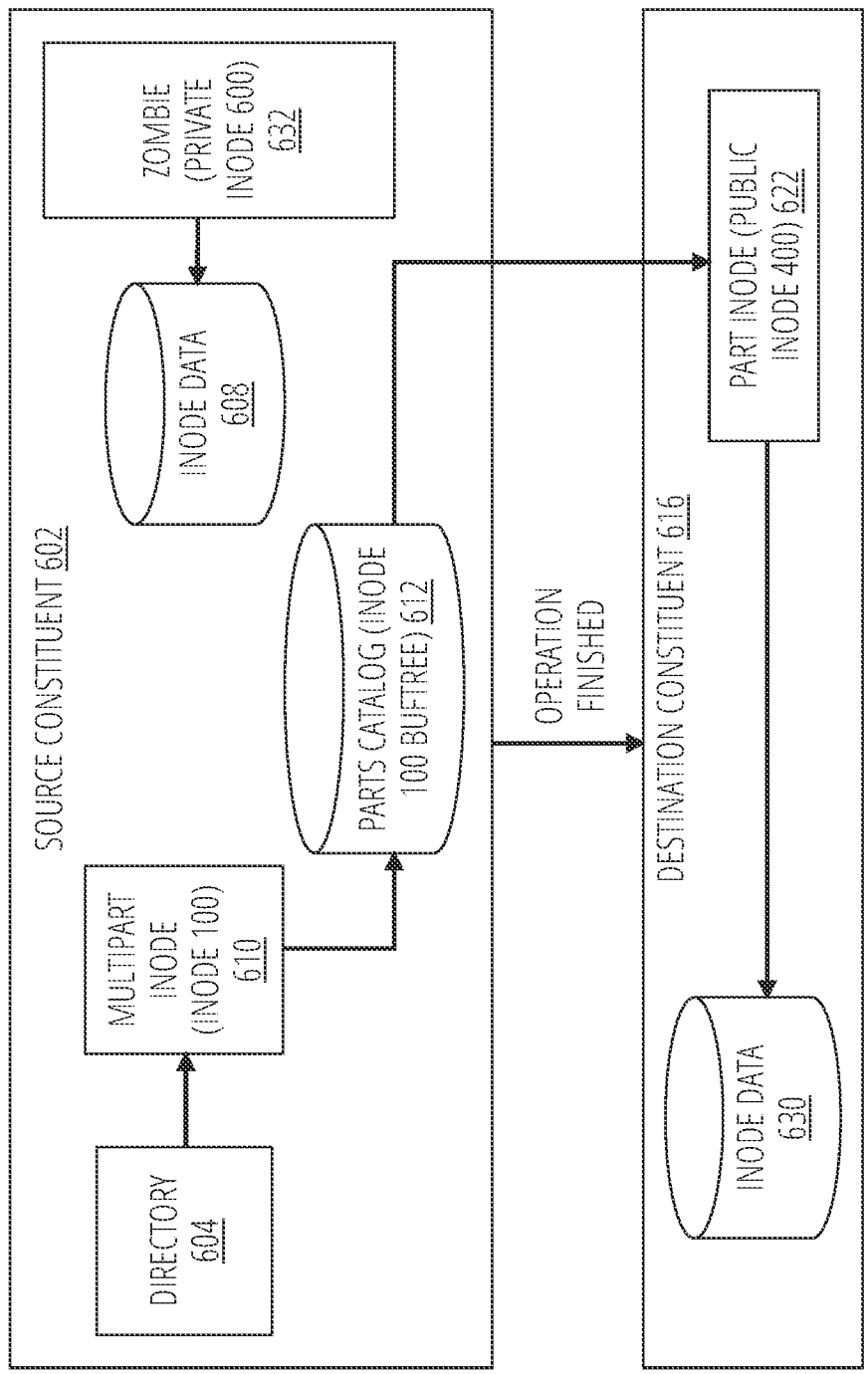
FIG. 6H illustrates an eighth stage of an example movement of a file from a first constituent to a second constituent using an example non-disruptive file move approach.

FIG. 6H illustrates an eighth stage of an example movement of a file from a first constituent to a second constituent using an example non-disruptive file move approach. Finally, the non-disruptive file movement agent can release blocks associated with backing inode (private inode 500) 624/zombie (private inode 600) 632.

Figure 7:
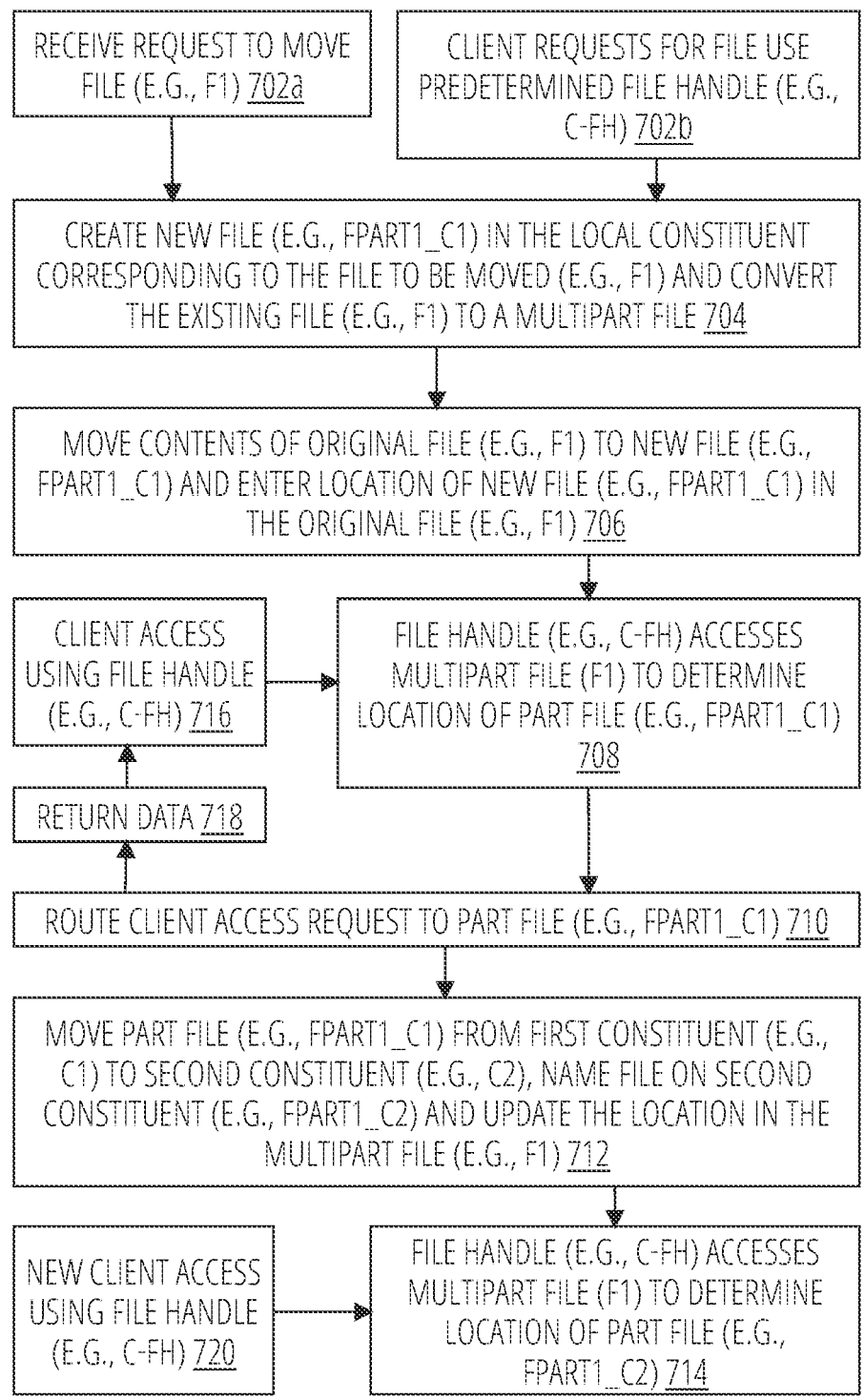
FIG. 7 is a flow diagram of an example file redistribution operation.

FIG. 7 is a flow diagram of an example file redistribution operation. In general, rebalancing of file between multiple constituents is a disruptive process that can interfere with client device access to files during the rebalancing process. Disruptive rebalancing has drawbacks including interruption of access to files, which interferes with operation of the file system. As described herein, an inode structure called a multipart inode forms the building blocks to non-disruptively move a file between constituents. In an example, a multipart inode acts as redirector file so that client still has access to valid file handle thus ensuring no disruptions.

For the following example, assume file (F1) is being moved from a first constituent (C1) to another constituent (C2). In the example, of FIG. 7, a request to move a file is received (e.g., block 702a), for example, by control mechanisms corresponding to the first constituent (C1). Requests and/or triggers to move files can be handled in other ways, for example, a trigger to move a file can be self-generated by the mechanisms for the first constituent (C1) that are responsible for moving (e.g., rebalancing) files.

The file to be moved (F1) has a corresponding file handle (C-FH) that client devices use to access the file (e.g., block 702b). During normal operation this file handle (C-FH) is used by client devices when generating requests to access the file (F1, which is currently on the first constituent (C1)). In order to provide a non-disruptive file move, clients should be able to utilize the same file handle (C-FH) to access the file (F1) during the movement process (otherwise, the move would be a disruptive move because file access would be temporarily interrupted).

When a file movement (e.g., non-disruptive retroactive file movement) occurs, a new file in C1 (FPart1_C1) is created and existing file (F1) is converted to a multipart file (e.g., block 704). In an example, the contents of the original file (F1) are moved to the new file (FPart1_C1) and the location of the new file (FPart1_C1) is an entry in the existing file (F1) that is now a multipart file (e.g., block 706).

When the client uses file handle (C-FH) to access the file (e.g., block 716), the access first lands into multipart file F1 where, as a multipart file, the access mechanism obtains a location of part file (FPart_C1) that hosts the data (e.g., block 710). The mechanism determines that part inode FPart1_C1 is in location C1 and routes the client traffic to FPart1_C1 and returns back requested data (e.g., block 718).

In an example, after converting the file to multipart file, constituent rebalancing uses a rebalancing engine (e.g., rebalancing engine 414) to effectively move the file (FPart1_C1) from the first constituent (C1) to a second constituent (C2). Once the file is moved to the second constituent (C2) as file FPart1_C2, the rebalancing engine changes the location of part inode in multipart inode to FPart1_C2 in C2 atomically (e.g., block 712).

New client traffic using the file handle (C-FH) (e.g., block 720) gets routed to FPart1_C2 through multipart file F1 (e.g., block 714). Hence, there is no disruption to client access as the file handle is intact throughout the file movement.

Note that above use case of multipart inode was specifically for non-disruptive file movement where one multipart file could have only one part inode. There are other use cases of multipart inodes.

Figure 8:
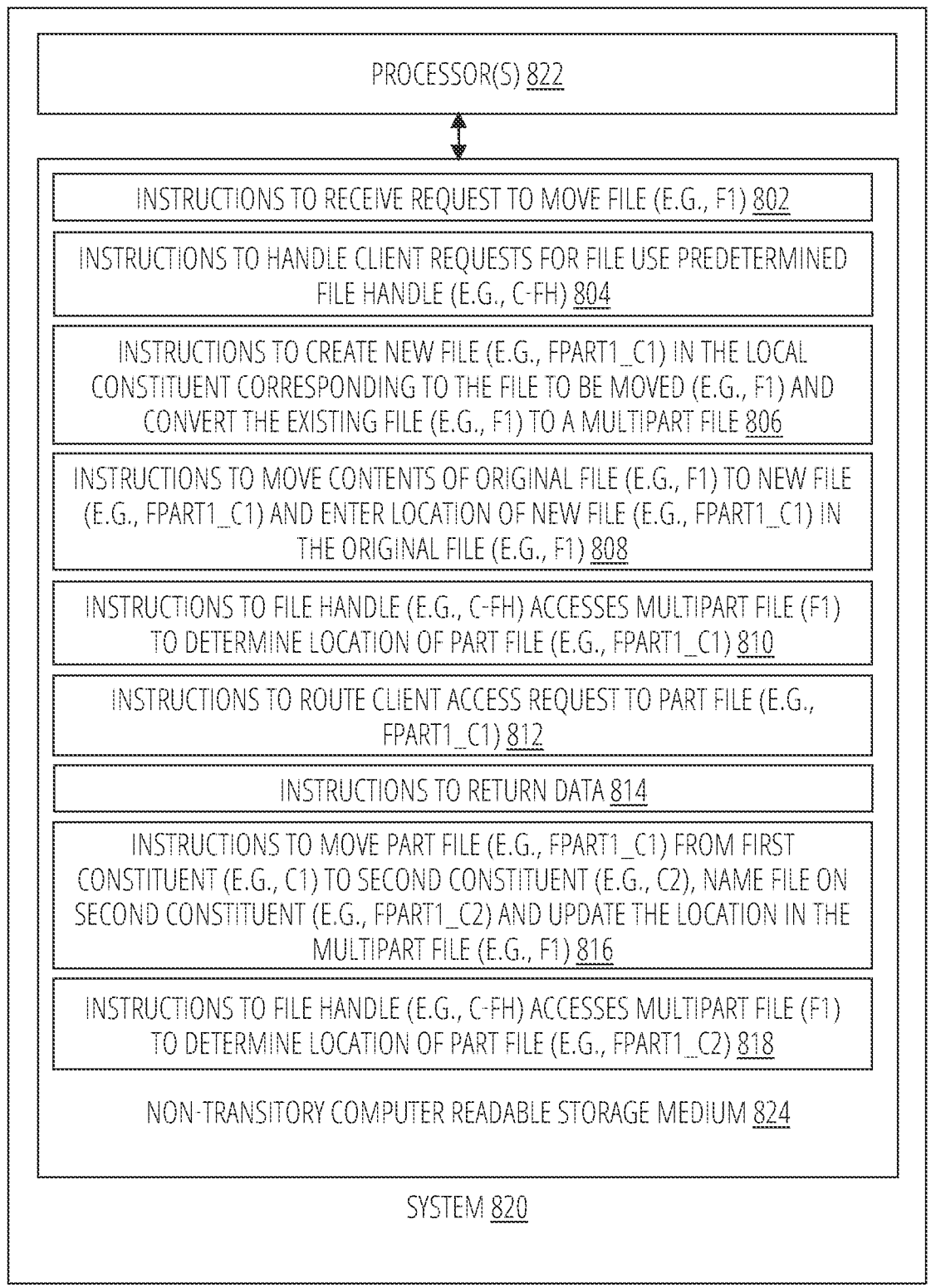
FIG. 8 is an example of a system to provide a process for performing file redistribution.

FIG. 8 is an example of a system to provide a process for performing file redistribution. In an example, system 820 can include processor(s) 822 and non-transitory computer readable storage medium 824. In an example, processor(s) 822 and non-transitory computer readable storage medium 824 can be part of a node (e.g., node 300) having a storage operating system (e.g., storage operating system 310) that can provide some or all of the functionality of the ONTAP software as mentioned above. In an example, system 820 can provide the functionality described herein with respect to the rebalancing engine (e.g., rebalancing engine 414).

Non-transitory computer readable storage medium 824 may store instructions 802, 804, 806, 808, 810, 812, 814, 816 and 818 that, when executed by processor(s) 822, cause processor(s) 822 to perform various functions. Examples of processor(s) 822 may include a microcontroller, a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of non-transitory computer readable storage medium 824 include tangible media such as random-access memory (RAM), read-only memory (ROM), electrically erasable programmable read-only memory (EEPROM), flash memory, a hard disk drive, etc.

For the following example, assume file (F1) is being moved from a first constituent (C1) to another constituent (C2). Instructions 802 cause processor(s) 822 to receive a request to move a file, for example, by control mechanisms corresponding to the first constituent (C1). Requests and/or triggers to move files can be handled in other ways, for example, a trigger to move a file can be self-generated by the mechanisms for the first constituent (C1) that are responsible for moving (e.g., rebalancing) files.

The file to be moved (F1) has a corresponding file handle (C-FH) that client devices use to access the file. During operation instructions 804 cause processor(s) 822 to use this file handle (C-FH) is used by client devices when generating requests to access the file (F1, which is currently on the first constituent (C1)). To provide a non-disruptive file move, clients should be able to utilize the same file handle (C-FH) to access the file (F1) during the movement process (otherwise, the move would be a disruptive move because file access would be temporarily interrupted).

Instructions 806 cause processor(s) 822 to, in response to a file movement (e.g., non-disruptive retroactive file movement), create a new file in C1 (FPart1_C1) and convert existing file (F1) to a multipart file.

Instructions 808 cause processor(s) 822 to move the contents of the original file (F1) to the new file (FPart1_C1)

and enter the location of the new file (which is a part inode) in the original file (F1) to provide the appropriate redirection.

Instructions 810 cause processor(s) 822 to handle file accesses from a client using the file handle (C-FH) to access the file, where the access first lands into multipart file F1 from which the access mechanism obtains a location of part file (FPart_C1) that hosts the data.

Instructions 812 cause processor(s) 822 to determine that part inode FPart1_C1 is in location C1 and route the client traffic to FPart1_C1.

Instructions 814 cause processor(s) 822 to return required data for the access request.

Instructions 816 cause processor(s) 822 to after converting the file to multipart file, constituent rebalancing uses a rebalancing engine to effectively move the file (FPart1_C1) from the first constituent (C1) to a second constituent (C2). Once the file is moved to the second constituent (C2) as file FPart1_C2, the rebalancing engine (e.g., rebalancing engine 414) changes the location of part inode in multipart inode to FPart1_C2 in C2 atomically.

Instructions 818 cause processor(s) 822 to handle new client traffic using the file handle (C-FH) and routes to FPart1_C2 through multipart file F1. Hence, there is no disruption to client access as the file handle is intact throughout the file movement.

Note that above use case of multipart inode was specifically for non-disruptive file movement where one multipart file could have only one part inode. There are other use cases of multipart inodes.

FIG. 9 illustrates one embodiment of a block diagram of an on-disk layout of an aggregate. Some of the elements illustrated in FIG. 9 can be utilized by a rebalancing scanner to evaluate files for potential movement to a remote container including, for example, filesystem file 922, hidden metadata root directory 942, etc.

The storage operating system (e.g., storage operating system 310) utilizes the RAID system (e.g., RAID system 1052), to assemble a physical volume of pvbns to create an aggregate (e.g., aggregate 402), with pvbns 1 and 2 comprising a "physical" volinfo block 902 for the aggregate. In an example, volinfo block 902 contains block pointers to fsinfo block(s) 904, each of which may represent a snapshot of the aggregate. Each fsinfo block(s) 904 includes a block pointer to an inode file 906 that contains inodes of a plurality of files, including owner map 908, active map 910, summary map 912 and space map 914, as well as other special meta-data files. Inode file 906 further includes root directory 916 and hidden metadata root directory 918, the latter of which includes a namespace having files related to a flexible volume in which users cannot "see" the files. In an example, hidden metadata root directory 918 includes the WAFL/fsid/ directory structure (WAFL/fsid 920) that contains filesystem file 922 and storage label file 924. In an example, root directory 916 in the aggregate is empty; files related to the aggregate are organized within hidden metadata root directory 918.

In addition to being embodied as a container file having level 1 blocks organized as a container map, filesystem file 922 includes block pointers that reference various file systems embodied as one or more flexible volume 926. The aggregate maintains these flexible volumes at special reserved inode numbers. In an example, each flexible volume 926 also has reserved inode numbers within its flexible volume space that are used for, among other things, the block allocation bitmap structures. As noted, the block allocation bitmap structures, e.g., active map 934, summary map 936 and space map 938, are located in each flexible volume.

Specifically, each flexible volume 926 has the same inode file structure/content as the aggregate, with the exception that there is no owner map and no WAFL/fsid/file system file, storage label file directory structure in hidden metadata root directory 942. To that end, each flexible volume 926 has volinfo block 928 that points to one or more fsinfo block(s) 930, each of which may represent a snapshot, along with the active file system of the flexible volume. Each fsinfo block, in turn, points to an inode file 932 that, as noted, has the same inode structure/content as the aggregate with the exceptions noted above. Each flexible volume 926 has its own inode file 932 and distinct inode space with corresponding inode numbers, as well as its own root directory 940 and subdirectories of files that can be exported separately from other flexible volumes.

Storage label file 924 contained within hidden metadata root directory 918 of the aggregate is a small file that functions as an analog to a conventional RAID label. A RAID label includes physical information about the storage system, such as the volume name; that information is loaded into storage label file 924. Illustratively, storage label file 924 includes the flexible volume name 944 of the associated flexible volume 926, online/offline status 946 of the flexible volume, and identity and state 948 of the associated flexible volume (whether it is in the process of being created or destroyed).

FIG. 10 is a schematic block diagram of a storage operating system that may be advantageously used with the subject matter. Storage operating system 1000 includes a series of software layers organized to form an integrated network protocol stack or, more generally, multi-protocol engine 1004 that provides data paths for clients to access information stored on a node using block and file access protocols. In an example, multi-protocol engine 1004 includes a media access layer (e.g., media access 1042, media access 1044) of network drivers (e.g., gigabit Ethernet drivers) that interfaces to network protocol layers, such as the Internet Protocol (IP) layer (e.g., IP 1038, IP 1040) and the corresponding supporting transport mechanisms, the Transport Control Protocol (TCP) layer (e.g., TCP 1030, TCP 1034) and the User Datagram Protocol (UDP) layer (e.g., UDP 1032).

An example file system (FS) protocol layer (e.g., FS 1036) provides multi-protocol file access and, to that end, includes support for Direct Access File System (DAFS) protocol (e.g., DAFS 1016), Network File System (NFS) protocol (e.g., NFS 1020), Common Internet File System (CIFS) protocol (e.g., CIFS 1022) and the Hypertext Transfer Protocol (HTTP) (e.g., HTTP 1024). Virtual Interface (VI) layer (e.g., VI 1018) implements an architecture to provide direct access transport (DAT) capabilities, such as Remote Direct Memory Access (RDMA), to support Direct Access File System (DAFS) protocol (e.g., DAFS 1016).

An Internet Small Computer Systems Interface (ISCSI) driver layer (e.g., iSCSI 1028) provides block protocol access over TCP/IP network protocol layers, while a Cluster Fabric (CF) driver layer (e.g., CF interface 1010) receives and transmits block access requests and responses to and from the node. In an example, the CF and iSCSI drivers provide CF-specific and iSCSI-specific access control to the blocks and, thus, manage exports of LUNs to either iSCSI or FCP or, alternatively, to both iSCSI and FCP when accessing the blocks on the node.

In addition, storage operating system 1000 includes a series of software layers organized to form storage server 1008 that provides data paths for accessing information stored on disks of a node. To that end, storage server 1008 includes file system module 1048 in cooperating relation with remote access module 1050, RAID system 1052 and disk driver system 1054. RAID system 1052 manages the storage and retrieval of information to and from the volumes/disks in accordance with I/O operations, while disk driver system 1054 implements a disk access protocol such as, e.g., the SCSI protocol.

File system module 1048 implements a virtualization system of storage operating system 1000 through the interaction with one or more virtualization modules illustratively embodied as, e.g., a virtual disk (vdisk) module (not shown) and SCSI target module 1026. SCSI target module 1026 is generally disposed between the FC and iSCSI 1028, file system 1036 and file system 1048 to provide a translation layer of the virtualization system between the block (LUN) space and the file system space, where LUNs are represented as blocks.

File system module 1048 is illustratively a message-based system that provides logical volume management capabilities for use in access to the information stored on the storage devices, such as disks. That is, in addition to providing file system semantics, file system module 1048 provides functions normally associated with a volume manager. These functions include (i) aggregation of the disks, (ii) aggregation of storage bandwidth of the disks, and (iii) reliability guarantees, such as mirroring and/or parity (RAID).

File system module 1048 illustratively implements an exemplary a file system having an on-disk format representation that is block-based using, e.g., 4 kilobyte (kB) blocks and using index nodes ("inodes") to identify files and file attributes (such as creation time, access permissions, size and block location). File system module 1048 uses files to store meta-data describing the layout of its file system; these meta-data files include, among others, an inode file. A file handle, i.e., an identifier that includes an inode number, is used to retrieve an inode from disk. As described in greater detail below, a rebalancing scanner can operation in storage operating system 1000 that supports inodes to scan and evaluate files in order to find one or more candidate files to move to a remote container.

Broadly stated, all inodes of the write-anywhere file system are organized into the inode file. A file system (FS) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from a client is forwarded as a packet over a network and onto a node where it is received via a network adapter. A network driver processes the packet and, if appropriate, passes it on to a network protocol and file access layer for additional processing prior to forwarding to the write-anywhere file system. Here, the file system generates operations to load (retrieve) the requested data from disk if it is not resident "in core", i.e., in memory. If the information is not in memory, the file system indexes into the inode file using the inode number to access an appropriate entry and retrieve a logical vbn. The file system then passes a message structure including the logical vbn to, for example, RAID system 1052; the logical vbn is mapped to a disk identifier and disk block number (disk,dbn) and sent to an appropriate driver (e.g., SCSI) of the disk driver system. The disk driver accesses the dbn from the specified disk and loads the requested data block(s) in memory for processing by the node. Upon completion of the request, the node (and operating system) returns a reply to the client over the network.

Remote access module 1050 is operatively interfaced between file system module 1048 and RAID system 1052. Remote access module 1050 is illustratively configured as part of the file system to implement the functionality to determine whether a newly created data container, such as a subdirectory, should be stored locally or remotely. Alternatively, remote access module 1050 may be separate from the file system. As such, the description of remote access module 1050 being part of the file system should be taken as exemplary only. Further, remote access module 1050 determines which remote flexible volume should store a new subdirectory if a determination is made that the subdirectory is to be stored remotely. More generally, remote access module 1050 implements the heuristics algorithms used for the adaptive data placement. However, it should be noted that the use of a remote access module should be taken as illustrative. In alternative aspects, the functionality may be integrated into the file system or other module of the storage operating system. As such, the description of remote access module 1050 performing certain functions should be taken as exemplary only.

It should be noted that while the subject matter is described in terms of locating new subdirectories, the principles of the disclosure may be applied at other levels of granularity, e.g., files, blocks, etc. As such, the description contained herein relating to subdirectories should be taken as exemplary only.

It should be noted that the software "path" through the storage operating system layers described above needed to perform data storage access for the client request received at the node may alternatively be implemented in hardware. That is, a storage access request data path may be implemented as logic circuitry embodied within a field programmable gate array (FPGA) or an application specific integrated circuit (ASIC). This type of hardware implementation increases the performance of the storage service provided by the node in response to a request issued by client 180. Alternatively, the processing elements of adapters (e.g., network adapter 318, storage adapter 326, cluster access adapter 322) may be configured to offload some or all of the packet processing and storage access operations, respectively, from the processor (e.g., processor 304, processor 306), to thereby increase the performance of the storage service provided by the node. It is expressly contemplated that the various processes, architectures and procedures described herein can be implemented in hardware, firmware or software.

Illustratively, storage server 1008 is embodied as disk blade 1006 of storage operating system 1000 to service one or more volumes of a disk array (e.g., disk array 246). In addition, multi-protocol engine 1004 is embodied as network blade 1002 to (i) perform protocol termination with respect to a client issuing incoming data access request packets over a network, as well as (ii) redirect those data access requests to any storage server of the cluster. Moreover, network blade 1002 and disk blade 1006 cooperate to provide a highly scalable, distributed storage system architecture for a cluster (e.g., cluster 200). To that end, each module includes a cluster fabric (CF) interface module (e.g., CF interface 1010, CF interface 1046) adapted to implement intra-cluster communication among the modules (e.g., utilizing CF protocol 1012), including disk element to disk element communication for data container striping operations, for example.

The protocol layers, e.g., the NFS/CIFS layers and the iSCSI/IFC layers, of network blade 1002 function as protocol servers that translate file-based and block-based data access requests from clients into CF protocol messages used for communication with disk blade 1006. That is, the network element servers convert the incoming data access requests into file system primitive operations (commands) that are embedded within CF messages by CF interface 1010 for transmission to disk blade 1006. Notably, CF interface 1010 and CF interface 1046 cooperate to provide a single file system image across all disk blades in a cluster. Thus, any network port of a network element that receives a client request can access any data container within the single file system image located on any disk element of the cluster.

Further, in an illustrative aspect of the disclosure, network blade 1002 and disk blade 1006 are implemented as separately scheduled processes of storage operating system 1000; however, in an alternate aspect, the network blade 1002 and disk blade 1006 may be implemented as pieces of code within a single operating system process. Communication between a network element and disk element is thus illustratively affected through the use of message passing between the modules although, in the case of remote communication between a network element and disk element of different nodes, such message passing occurs over cluster switching fabric 216. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp™, Inc.

CF interface 1010 and CF interface 1046 implement a CF protocol for communicating file system commands among the modules of the cluster. Communication is illustratively affected by the disk element exposing the CF API to which a network element (or another disk element) issues calls. To that end, the CF interface modules are organized as a CF encoder and CF decoder. The CF encoder encapsulates a CF message as (i) a local procedure call (LPC) when communicates a file system command to a disk element residing on the same node or (ii) a remote procedure call (RPC) when communicating the command to a disk element residing on a remote node of the cluster. In either case, the CF decoder de-encapsulates the CF message and processes the file system command.

Illustratively, the remote access module may utilize CF messages to communicate with remote nodes to collect information relating to remote flexible volumes. A CF message is used for RPC communication over the switching fabric between remote modules of the cluster; however, it should be understood that the term "CF message" may be used generally to refer to LPC and RPC communication between modules of the cluster. The CF message includes a media access layer, an IP layer, a UDP layer, a reliable connection (RC) layer and a CF protocol layer. The CF protocol is a generic file system protocol that conveys file system commands related to operations contained within client requests to access data containers stored on the cluster; the CF protocol layer is that portion of a message that carries the file system commands. Illustratively, the CF protocol is datagram based and, as such, involves transmission of messages or "envelopes" in a reliable manner from a source (e.g., network blade 1002) to a destination (e.g., disk blade 1006). The RC layer implements a reliable transport protocol that is adapted to process such envelopes in accordance with a connectionless protocol, such as UDP.

In one embodiment, a data container is represented in the write-anywhere file system as an inode data structure adapted for storage on the disks. In such an embodiment, an inode includes a meta-data section and a data section. The information stored in the meta-data section of each inode describes the data container (e.g., a file) and, as such, includes the type (e.g., regular, directory, vdisk) of file, its size, time stamps (e.g., access and/or modification time) and ownership (e.g., user identifier (UID) and group ID (GID), of the file, and a generation number. The contents of the data section of each inode may be interpreted differently depending upon the type of file (inode) defined within the type field. For example, the data section of a directory inode includes meta-data controlled by the file system, whereas the data section of a regular inode includes file system data. In this latter case, the data section includes a representation of the data associated with the file.

Specifically, the data section of a regular on-disk inode may include file system data or pointers, the latter referencing 4 KB data blocks on disk used to store the file system data. Each pointer is preferably a logical vbn to facilitate efficiency among the file system and the RAID system when accessing the data on disks. Given the restricted size (e.g., 228 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section of the inode (e.g., a second level inode) references an indirect block (e.g., a first level L1 block) that contains 1024 pointers, each of which references a 4 KB data block on disk. For file system data having a size greater than 64 MB, each pointer in the data section of the inode (e.g., a third level L3 inode) references a double-indirect block (e.g., a second level L2 block) that contains 1024 pointers, each referencing an indirect (e.g., a first level L1) block. The indirect block, in turn, which contains 1024 pointers, each of which references a 4 kB data block on disk. When accessing a file, each block of the file may be loaded from disk into the memory.

When an on-disk inode (or block) is loaded from disk into memory, its corresponding in-core structure embeds the on-disk structure. For example, the dotted line surrounding the inode indicates the in-core representation of the on-disk inode structure. The in-core structure is a block of memory that stores the on-disk structure plus additional information needed to manage data in the memory (but not on disk). The additional information may include, e.g., a "dirty" bit. After data in the inode (or block) is updated/modified as instructed by, e.g., a write operation, the modified data is marked "dirty" using the dirty bit so that the inode (block) can be subsequently "flushed" (stored) to disk.

According to one embodiment, a file in a file system comprises a buffer tree ("buftree") that provides an internal representation of blocks for a file loaded into memory and maintained by the write-anywhere file system. A root (top-level) inode, such as an embedded inode, references indirect (e.g., level 1) blocks. In other embodiments, there may be additional levels of indirect blocks (e.g., level 2, level 3) depending upon the size of the file. The indirect blocks (e.g., and inode) includes pointers that ultimately reference data blocks used to store the actual data of the file. That is, the data of file are contained in data blocks and the locations of these blocks are stored in the indirect blocks of the file. Each level 1 indirect block may include pointers to as many as 1024 data blocks. According to the "write anywhere" nature of the file system, these blocks may be located anywhere on the disks.

Embodiments may be implemented as any or a combination of one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

The terms "component", "module", "system," and the like as used herein are intended to refer to a computer-related entity, either software-executing general-purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

What is claimed is:

1. In a distributed storage system having a first constituent to store files and a second constituent to store files, a method comprising:
    receiving a request to move a target file from the first constituent to the second constituent, the file having an associated file handle;
    converting the target file in the first constituent to a multipart file in the first constituent with a file location for the multipart file in the first constituent;
    creating a new file in the second constituent;
    moving contents of the target file to the new file in the second constituent while maintaining access to the target file via the associated file handle via access to the multipart file by changing location information for the multipart file from indicating the target file in the first constituent to indicating the new file in the second constituent and updating location information associated with the new file in the second constituent to store inode data for the new file in the second constituent;
    deleting the target file from the first constituent.

2. The method of claim 1 further comprising:
    receiving a subsequent request to move the new file from the second constituent to a third constituent;

creating a new file in the third constituent;
moving contents of the new file in the second constituent to the new file in the third constituent while maintaining access to the new file in the second constituent via the associated file handle and via access to the multipart file;
deleting the new file from the second constituent.

3. The method of claim 1 wherein the location information for the multipart file from indicating the target file in the first constituent is changed to indicating the new file in the second constituent in a buffer tree and updating location information associated with the new file in the second constituent to store inode data for the new file in the second constituent comprises updating buffer tree information.

4. The method of claim 1 wherein creating a new file in the second constituent further comprises:
generating a private file in the second constituent;
allocating space for a buffer tree for the private file in the second constituent;
creating a public file in the second constituent, wherein the public file comprises the new file in the second constituent;
linking the public file to the buffer tree for the private file;
removing the link from the private file to the buffer tree.

5. The method of claim 1 wherein the new file in the second constituent comprises a part inode file.

6. The method of claim 1 wherein the multipart file comprises at least a link to a parts catalog having links to one or more part inode files that each comprise a portion of user data previously stored in the multipart file.

7. The method of claim 1 wherein the distributed storage system utilizes a write anywhere file system.

8. The method of claim 1 wherein the request to move the target file is received from either a rebalancing engine or a rebalancing scanner.

9. The method of claim 1 wherein at least one of the first constituent and the second constituent reside in cloud storage.

10. A non-transitory computer readable medium having stored thereon instructions that, when executed, cause one or more processors to:
receive a request to move a target file from the first constituent to the second constituent, the file having an associated file handle;
convert the target file in the first constituent to a multipart file in the first constituent with a file location for the multipart file in the first constituent;
create a new file in the second constituent;
move contents of the target file to the new file in the second constituent while maintaining access to the target file via the associated file handle via access to the multipart file by changing location information for the multipart file from indicating the target file in the first constituent to indicating the new file in the second constituent and updating location information associated with the new file in the second constituent to store inode data for the new file in the second constituent;
delete the target file from the first constituent.

11. The non-transitory computer readable medium of claim 10 further comprising instructions that, when executed, cause the one or more processors to:
receive a subsequent request to move the new file from the second constituent to a third constituent;
create a new file in the third constituent;
move contents of the new file in the second constituent to the new file in the third constituent while maintaining access to the new file in the second constituent via the associated file handle and via access to the multipart file;
delete the new file from the second constituent.

12. The non-transitory computer readable medium of claim 10 wherein changing the location information for the multipart file from indicating the target file in the first constituent is changed to indicating the new file in the second constituent in a buffer tree and updating location information associated with the new file in the second constituent to store inode data for the new file in the second constituent comprises updating buffer tree information.

13. The non-transitory computer-readable medium of claim 10 wherein the instructions that, when executed, cause the one or more processors to create a new file in the second constituent further comprise instructions that, when executed, cause the one or more processors to:
generate a private file in the second constituent;
allocate space for a buffer tree for the private file in the second constituent;
create a public file in the second constituent, wherein the public file comprises the new file in the second constituent;
link the public file to the buffer tree for the private file;
remove the link from the private file to the buffer tree.

14. The non-transitory computer readable medium of claim 10 wherein the new file in the second constituent comprises a part inode file.

15. The non-transitory computer readable medium of claim 10 wherein the multipart file comprises at least a link to a parts catalog having links to one or more part inode files that each comprise a portion of user data previously stored in the multipart file.

16. The non-transitory computer-readable medium of claim 10 wherein the distributed storage system utilizes a write-anywhere file system.

17. The non-transitory computer readable medium of claim 10 wherein the request to move the target file is received from either a rebalancing engine or a rebalancing scanner.

18. The non-transitory computer-readable medium of claim 10 wherein at least one of the first constituent and the second constituent reside in cloud storage.

19. A non-disruptive file movement agent in a distributed storage system, the non-disruptive file movement agent is configured to:
receive a request to move a target file from the first constituent to the second constituent, the file having an associated file handle;
convert the target file in the first constituent to a multipart file in the first constituent with a file location for the multipart file in the first constituent;
creating a new file in the second constituent;
move contents of the target file to the new file in the second constituent while maintaining access to the target file via the associated file handle via access to the multipart file by changing location information for the multipart file from indicating the target file in the first constituent to indicating the new file in the second constituent and updating location information associated with the new file in the second constituent to store inode data for the new file in the second constituent;
delete the target file from the first constituent.

20. The non-disruptive file movement agent of claim 19 wherein the non-disruptive file movement agent is further configured to:

receive a subsequent request to move the new file from the second constituent to a third constituent;
create a new file in the third constituent;
move contents of the new file in the second constituent to the new file in the third constituent while maintaining access to the new file in the second constituent via the associated file handle and via access to the multipart file;
delete the new file from the second constituent.

21. The non-disruptive file movement agent of claim 19 wherein changing the location information for the multipart file from indicating the target file in the first constituent is changed to indicating the new file in the second constituent in a buffer tree and updating location information associated with the new file in the second constituent to store inode data for the new file in the second constituent comprises updating buffer tree information.

22. The non-disruptive file movement agent of claim 19 wherein creating a new file in the second constituent further comprises:
generating a private file in the second constituent;
allocating space for a buffer tree for the private file in the second constituent;
creating a public file in the second constituent, wherein the public file comprises the new file in the second constituent;
linking the public file to the buffer tree for the private file;
removing the link from the private file to the buffer tree.

23. The non-disruptive file movement agent of claim 19 wherein the new file in the second constituent comprises a part inode file.

24. The non-disruptive file movement agent of claim 19 wherein the multipart file comprises at least a link to a parts catalog having links to one or more part inode files that each comprise a portion of user data previously stored in the multipart file.

25. The non-disruptive file movement agent of claim 19 wherein the distributed storage system utilizes a write anywhere file system.

26. The non-disruptive file movement agent of claim 19 wherein the request to move the target file is received from either a rebalancing engine or a rebalancing scanner.

27. The non-disruptive file movement agent of claim 19 wherein at least one of the first constituent and the second constituent reside in cloud storage.

\* \* \* \* \*